United States Patent
Salter et al.

(10) Patent No.: US 10,131,237 B2
(45) Date of Patent: *Nov. 20, 2018

(54) ILLUMINATED VEHICLE CHARGING SYSTEM

(71) Applicant: Ford Global Technologies, LLC, Dearborn, MI (US)

(72) Inventors: Stuart C. Salter, White Lake, MI (US); Paul Kenneth Dellock, Northville, MI (US); Harry Lobo, Canton, MI (US); James A. Lathrop, Saline, MI (US); Terry Padgett, New Boston, MI (US); Sriram Jala, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/189,637

(22) Filed: Jun. 22, 2016

(65) Prior Publication Data

US 2017/0368954 A1   Dec. 28, 2017

(51) Int. Cl.
*H02J 7/00* (2006.01)
*B60L 11/18* (2006.01)
(Continued)

(52) U.S. Cl.
CPC ........... *B60L 11/1824* (2013.01); *B60L 11/18* (2013.01); *B60L 11/182* (2013.01); *H02J 50/10* (2016.02);
(Continued)

(58) Field of Classification Search
CPC .... B60L 11/182; B60L 11/1824; B60L 11/18; H05B 33/0842; H05B 33/084266; H02J 50/10; H02J 50/40
See application file for complete search history.

(56) References Cited

U.S. PATENT DOCUMENTS 2,486,859 A   11/1949   Meijer et al.
5,053,930 A   10/1991   Benavides
(Continued)

FOREIGN PATENT DOCUMENTS

CN   101337492 A   1/2009
CN   201169230 Y   2/2009
(Continued)

*Primary Examiner* — Vuthe Siek
(74) *Attorney, Agent, or Firm* — Jason Rogers; Price Heneveld LLP

(57) ABSTRACT

A wireless vehicle charging system is provided herein. The charging system includes a charging station having a power source and a charging station interface operably coupled to a primary coil assembly. The primary coil assembly includes a primary coil therein for generating a magnetic field. An illumination system is disposed within the primary coil assembly and includes a passive illumination system and an active illumination system. A first photoluminescent structure is disposed within the passive illumination system and is configured to luminesce in response to excitation by an incident light. A second photoluminescent structure is disposed within the active illumination system and is configured to luminesce in response to excitation by a light source. A vehicle having a secondary coil assembly thereon is operably coupled with a rectifier and is configured to transmit electrical current from the secondary coil assembly to a battery.

20 Claims, 12 Drawing Sheets

(51) Int. Cl.
*H02J 50/10* (2016.01)
*H05B 33/08* (2006.01)
*H02J 50/40* (2016.01)

(52) U.S. Cl.
CPC .......... *H02J 50/40* (2016.02); *H05B 33/0842* (2013.01)

(56) References Cited

U.S. PATENT DOCUMENTS

| | | |
|---|---|---|
| 5,434,013 A | 7/1995 | Fernandez |
| 5,709,453 A | 1/1998 | Krent et al. |
| 5,839,718 A | 11/1998 | Hase et al. |
| 6,031,511 A | 2/2000 | DeLuca et al. |
| 6,117,362 A | 9/2000 | Yen et al. |
| 6,260,988 B1 | 7/2001 | Misawa et al. |
| 6,294,990 B1 | 9/2001 | Knoll et al. |
| 6,419,854 B1 | 7/2002 | Yocom et al. |
| 6,494,490 B1 | 12/2002 | Trantoul |
| 6,577,073 B2 | 6/2003 | Shimizu et al. |
| 6,729,738 B2 | 5/2004 | Fuwausa et al. |
| 6,737,964 B2 | 5/2004 | Samman et al. |
| 6,773,129 B2 | 8/2004 | Anderson, Jr. et al. |
| 6,820,888 B1 | 11/2004 | Griffin |
| 6,851,840 B2 | 2/2005 | Ramamurthy et al. |
| 6,859,148 B2 | 2/2005 | Miller |
| 6,871,986 B2 | 3/2005 | Yamanaka et al. |
| 6,953,536 B2 | 10/2005 | Yen et al. |
| 6,990,922 B2 | 1/2006 | Ichikawa et al. |
| 7,015,893 B2 | 3/2006 | Li et al. |
| 7,161,472 B2 | 1/2007 | Strumolo et al. |
| 7,213,923 B2 | 5/2007 | Liu et al. |
| 7,216,997 B2 | 5/2007 | Anderson, Jr. |
| 7,249,869 B2 | 7/2007 | Takahashi et al. |
| 7,264,366 B2 | 9/2007 | Hulse |
| 7,264,367 B2 | 9/2007 | Hulse |
| 7,347,576 B2 | 3/2008 | Wang et al. |
| 7,354,182 B2 | 4/2008 | Bartels |
| 7,441,914 B2 | 10/2008 | Palmer et al. |
| 7,458,698 B2 | 12/2008 | Heathcock et al. |
| 7,501,749 B2 | 3/2009 | Takeda et al. |
| 7,575,349 B2 | 8/2009 | Bucher et al. |
| 7,635,212 B2 | 12/2009 | Seidler |
| 7,726,856 B2 | 6/2010 | Tsutsumi |
| 7,745,818 B2 | 6/2010 | Sofue et al. |
| 7,753,541 B2 | 7/2010 | Chen et al. |
| 7,834,548 B2 | 11/2010 | Jousse et al. |
| 7,862,220 B2 | 1/2011 | Cannon et al. |
| 7,876,205 B2 | 1/2011 | Catten et al. |
| 7,987,030 B2 | 7/2011 | Flores et al. |
| 8,016,465 B2 | 9/2011 | Egerer et al. |
| 8,022,818 B2 | 9/2011 | la Tendresse et al. |
| 8,044,415 B2 | 10/2011 | Messere et al. |
| 8,066,416 B2 | 11/2011 | Bucher |
| 8,071,988 B2 | 12/2011 | Lee et al. |
| 8,097,843 B2 | 1/2012 | Agrawal et al. |
| 8,103,414 B2 | 1/2012 | Boss et al. |
| 8,118,441 B2 | 2/2012 | Hessling |
| 8,120,236 B2 | 2/2012 | Auday et al. |
| 8,136,425 B2 | 3/2012 | Bostick |
| 8,169,131 B2 | 5/2012 | Murazaki et al. |
| 8,178,852 B2 | 5/2012 | Kingsley et al. |
| 8,197,105 B2 | 6/2012 | Yang |
| 8,203,260 B2 | 6/2012 | Li et al. |
| 8,207,511 B2 | 6/2012 | Bortz et al. |
| 8,232,533 B2 | 7/2012 | Kingsley et al. |
| 8,247,761 B1 | 8/2012 | Agrawal et al. |
| 8,261,686 B2 | 9/2012 | Birman et al. |
| 8,286,378 B2 | 10/2012 | Martin et al. |
| 8,317,329 B2 | 11/2012 | Seder et al. |
| 8,317,359 B2 | 11/2012 | Harbers et al. |
| 8,408,765 B2 | 4/2013 | Kuhlman et al. |
| 8,408,766 B2 | 4/2013 | Wilson et al. |
| 8,415,642 B2 | 4/2013 | Kingsley et al. |
| 8,421,811 B2 | 4/2013 | Odland et al. |
| 8,459,832 B2 | 6/2013 | Kim |
| 8,466,438 B2 | 6/2013 | Lambert et al. |
| 8,519,359 B2 | 8/2013 | Kingsley et al. |
| 8,519,362 B2 | 8/2013 | Labrot et al. |
| 8,539,702 B2 | 9/2013 | Li et al. |
| 8,552,848 B2 | 10/2013 | Rao et al. |
| 8,606,430 B2 | 12/2013 | Seder et al. |
| 8,624,716 B2 | 1/2014 | Englander |
| 8,631,598 B2 | 1/2014 | Li et al. |
| 8,653,553 B2 | 2/2014 | Yamazaki et al. |
| 8,664,624 B2 | 3/2014 | Kingsley et al. |
| 8,683,722 B1 | 4/2014 | Cowan |
| 8,724,054 B2 | 5/2014 | Jones |
| 8,754,426 B2 | 6/2014 | Marx et al. |
| 8,773,012 B2 | 7/2014 | Ryu et al. |
| 8,846,184 B2 | 9/2014 | Agrawal et al. |
| 8,851,694 B2 | 10/2014 | Harada |
| 8,876,352 B2 | 11/2014 | Robbins et al. |
| 8,905,610 B2 | 12/2014 | Coleman et al. |
| 8,922,388 B2 | 12/2014 | Nykerk |
| 8,937,454 B2 | 1/2015 | Baarman et al. |
| 8,952,341 B2 | 2/2015 | Kingsley et al. |
| 8,963,705 B2 | 2/2015 | Miller et al. |
| 8,994,495 B2 | 3/2015 | Dassanayake et al. |
| 9,006,751 B2 | 4/2015 | Kleo et al. |
| 9,018,833 B2 | 4/2015 | Lowenthal et al. |
| 9,057,021 B2 | 6/2015 | Kingsley et al. |
| 9,059,378 B2 | 6/2015 | Verger et al. |
| 9,065,447 B2 | 6/2015 | Buttolo et al. |
| 9,067,530 B2 | 6/2015 | Bayersdorfer et al. |
| 9,187,034 B2 | 11/2015 | Tarahomi et al. |
| 9,194,168 B1 | 11/2015 | Lu et al. |
| 9,299,887 B2 | 3/2016 | Lowenthal et al. |
| 9,315,148 B2 | 4/2016 | Schwenke et al. |
| 9,442,888 B2 | 9/2016 | Stanfield et al. |
| 9,452,709 B2 | 9/2016 | Aburto Crespo |
| 9,568,659 B2 | 2/2017 | Verger et al. |
| 9,579,987 B2 | 2/2017 | Penilla et al. |
| 9,616,812 B2 | 4/2017 | Sawayanagi |
| 2002/0159741 A1 | 10/2002 | Graves et al. |
| 2002/0163792 A1 | 11/2002 | Formoso |
| 2003/0167668 A1 | 9/2003 | Fuks et al. |
| 2003/0179548 A1 | 9/2003 | Becker et al. |
| 2004/0213088 A1 | 10/2004 | Fuwausa |
| 2005/0084229 A1 | 4/2005 | Babbitt et al. |
| 2005/0189795 A1 | 9/2005 | Roessler |
| 2006/0087826 A1 | 4/2006 | Anderson, Jr. |
| 2006/0097121 A1 | 5/2006 | Fugate |
| 2007/0030136 A1 | 2/2007 | Teshima et al. |
| 2007/0032319 A1 | 2/2007 | Tufte |
| 2007/0285938 A1 | 12/2007 | Palmer et al. |
| 2007/0297045 A1 | 12/2007 | Sakai et al. |
| 2008/0205075 A1 | 8/2008 | Hikmet et al. |
| 2009/0217970 A1 | 9/2009 | Zimmerman et al. |
| 2009/0219730 A1 | 9/2009 | Syfert et al. |
| 2009/0251920 A1 | 10/2009 | Kino et al. |
| 2009/0260562 A1 | 10/2009 | Folstad et al. |
| 2009/0262515 A1 | 10/2009 | Lee et al. |
| 2010/0102736 A1 | 4/2010 | Hessling |
| 2011/0012062 A1 | 1/2011 | Agrawal et al. |
| 2011/0265360 A1 | 11/2011 | Podd et al. |
| 2012/0001406 A1 | 1/2012 | Paxton et al. |
| 2012/0020101 A1 | 1/2012 | Pastrick et al. |
| 2012/0104954 A1 | 5/2012 | Huang |
| 2012/0183677 A1 | 7/2012 | Agrawal et al. |
| 2012/0280528 A1 | 11/2012 | Dellock et al. |
| 2013/0009855 A1 | 1/2013 | Gally et al. |
| 2013/0038272 A1* | 2/2013 | Sagata ............ B60L 11/182 320/106 |
| 2013/0050979 A1 | 2/2013 | Van De Ven et al. |
| 2013/0092965 A1 | 4/2013 | Kijima et al. |
| 2013/0154821 A1 | 6/2013 | Miller et al. |
| 2013/0335994 A1 | 12/2013 | Mulder et al. |
| 2014/0003044 A1 | 1/2014 | Harbers et al. |
| 2014/0029281 A1 | 1/2014 | Suckling et al. |
| 2014/0065442 A1 | 3/2014 | Kingsley et al. |
| 2014/0103258 A1 | 4/2014 | Agrawal et al. |
| 2014/0211498 A1 | 7/2014 | Cannon et al. |
| 2014/0264396 A1 | 9/2014 | Lowenthal et al. |
| 2014/0266666 A1 | 9/2014 | Habibi |

(56) References Cited

U.S. PATENT DOCUMENTS

| | | |
|---|---|---|
| 2014/0288832 A1 | 9/2014 | Hoch et al. |
| 2014/0373898 A1 | 12/2014 | Rogers et al. |
| 2015/0046027 A1 | 2/2015 | Sura et al. |
| 2015/0085488 A1 | 3/2015 | Grote, III et al. |
| 2015/0109602 A1 | 4/2015 | Martin et al. |
| 2015/0137747 A1* | 5/2015 | Salter ............ A61L 2/10 320/108 |
| 2015/0138789 A1 | 5/2015 | Singer et al. |
| 2015/0267881 A1 | 9/2015 | Salter et al. |
| 2015/0307033 A1 | 10/2015 | Preisler et al. |
| 2015/0324708 A1 | 11/2015 | Skipp et al. |
| 2015/0339928 A1 | 11/2015 | Ramanujam |
| 2015/0346727 A1 | 12/2015 | Ramanujam |
| 2015/0366036 A1 | 12/2015 | Luostarinen |
| 2016/0016506 A1 | 1/2016 | Collins et al. |
| 2016/0082880 A1 | 3/2016 | Co et al. |
| 2016/0102819 A1 | 4/2016 | Misawa et al. |
| 2016/0131327 A1 | 5/2016 | Moon et al. |
| 2016/0214535 A1 | 7/2016 | Penilla et al. |
| 2016/0236613 A1 | 8/2016 | Trier |
| 2016/0240794 A1 | 8/2016 | Yamada et al. |
| 2017/0158125 A1 | 6/2017 | Schuett et al. |
| 2017/0213165 A1 | 7/2017 | Stauffer et al. |
| 2017/0253179 A1 | 9/2017 | Kumada |

FOREIGN PATENT DOCUMENTS

| | | |
|---|---|---|
| CN | 201193011 Y | 2/2009 |
| CN | 202357840 U | 8/2012 |
| CN | 204127823 U | 1/2015 |
| CN | 104869728 A | 8/2015 |
| CN | 105303642 A | 2/2016 |
| DE | 4120677 A1 | 1/1992 |
| DE | 29708699 U1 | 7/1997 |
| DE | 10319396 A1 | 11/2004 |
| EP | 1793261 A1 | 6/2007 |
| EP | 2719580 A1 | 4/2014 |
| EP | 2778209 A1 | 9/2014 |
| JP | 2000052859 A | 2/2000 |
| JP | 2000159011 A | 6/2000 |
| JP | 2007238063 A | 9/2007 |
| KR | 20060026531 A | 3/2006 |
| WO | 2006047306 A1 | 5/2006 |
| WO | 2008093266 A1 | 8/2008 |
| WO | 2014068440 A1 | 5/2014 |
| WO | 2014161927 A1 | 10/2014 |

* cited by examiner

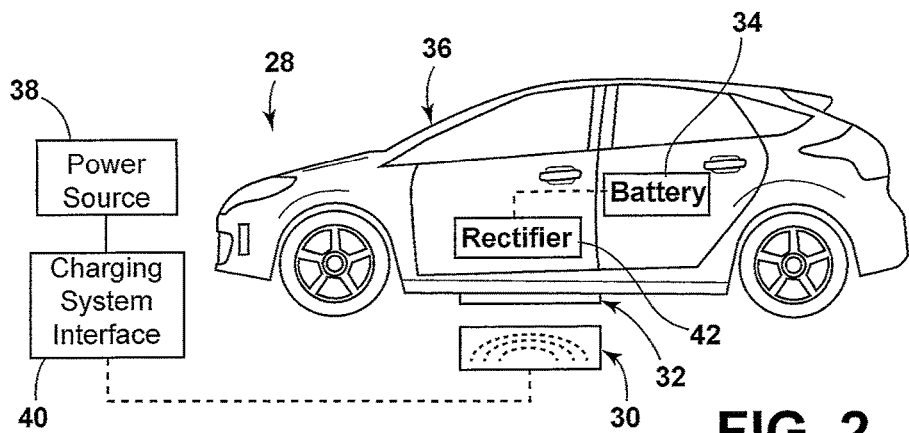
FIG. 2
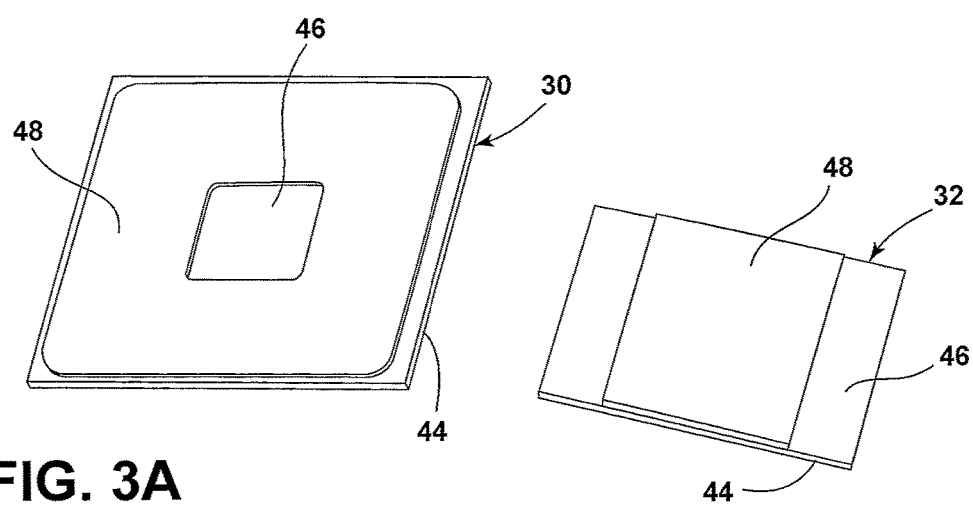
FIG. 3A
FIG. 3B
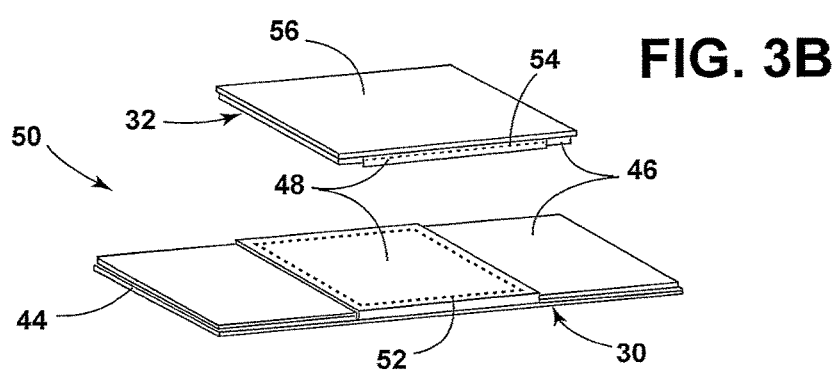
FIG. 4

ILLUMINATED VEHICLE CHARGING SYSTEM

FIELD OF THE INVENTION

The present disclosure generally relates to vehicle lighting systems, and more particularly, to vehicle lighting systems employing one or more photoluminescent structures.

BACKGROUND OF THE INVENTION

Illumination arising from the use of photoluminescent structures offers a unique and attractive viewing experience. It is therefore desired to implement such structures in automotive vehicles for various lighting applications.

SUMMARY OF THE INVENTION

According to one aspect of the present invention, a wireless vehicle charging system is disclosed. The charging system includes a charging station having a power source and a charging station interface operably coupled to a primary coil assembly. The primary coil assembly includes a primary coil therein for generating a magnetic field. An illumination system is disposed within the primary coil assembly and includes a passive illumination system and an active illumination system. A first photoluminescent structure is disposed within the passive illumination system and is configured to luminesce in response to excitation by an incident light. A second photoluminescent structure is disposed within the active illumination system and is configured to luminesce in response to excitation by a light source. A vehicle having a secondary coil assembly thereon is operably coupled with a rectifier and is configured to transmit electrical current from the secondary coil assembly to a battery.

According to another aspect of the present invention, a charging system is disclosed. The charging system includes a primary coil assembly including a primary coil therein for generating a magnetic field. A secondary coil assembly is operably coupled with a rectifier and is configured to transmit electrical current from the secondary coil assembly to a battery. A photoluminescent structure is disposed on the primary coil assembly and is configured to luminesce in response to excitation by a light source. A controller for selectively activates the light source.

According to yet another aspect of the present invention, a charging system is disclosed. The charging system includes a charging station coupled to a vehicle and configured to transmit electrical current from the charging station to a battery. A first photoluminescent structure is disposed on the charging station and configured to luminesce in response to excitation by an incident light.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 2 is an exemplary wireless power transfer system, according to one embodiment;

FIG. 3A is an exemplary embodiment of a primary coil assembly for an inductive wireless power transfer system;

FIG. 3B is an exemplary embodiment of a secondary coil assembly for an inductive wireless power transfer system;

FIG. 4 is an exemplary embodiment of a polarized coupler pair having the secondary coil assembly over the primary coil assembly;

DETAILED DESCRIPTION OF THE PREFERRED EMBODIMENTS

As required, detailed embodiments of the present invention are disclosed herein. However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The following disclosure describes an illumination assembly for a vehicle charging system. The illumination assembly may include one or more photoluminescent structures configured to convert an excitation light received from an associated light source to a converted light at a different wavelength typically found in the visible spectrum. According to some embodiments, the lighting assembly may be used in conjunction with a vehicle sensor to monitor an area that surrounds the vehicle.

Figure 1A:
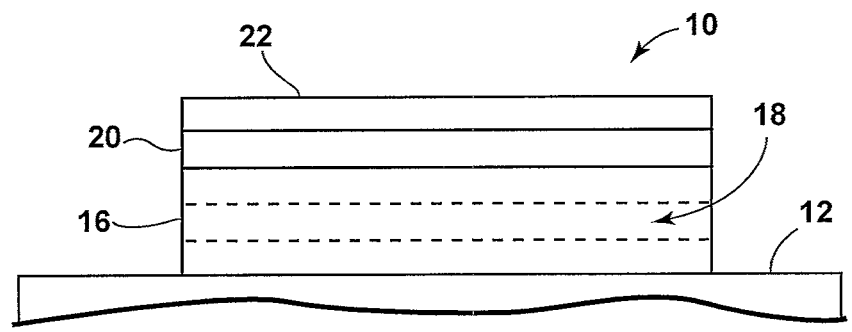
FIG. 1A is a side view of a photoluminescent structure rendered as a coating for use in a vehicle lighting assembly according to one embodiment.
Figure 1B:
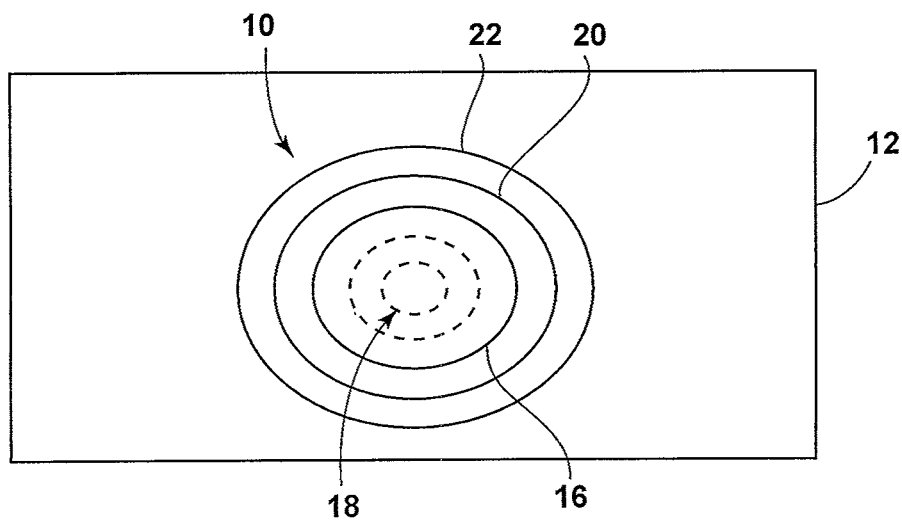
FIG. 1B is a top view of a photoluminescent structure rendered as a discrete particle according to one embodiment.
Figure 1C:
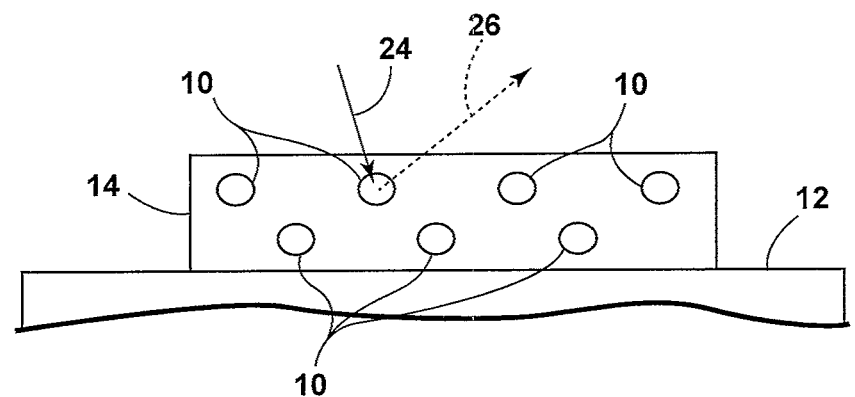
FIG. 1C is a side view of a plurality of photoluminescent structures rendered as discrete particles and incorporated into a separate structure.

Referring to FIGS. 1A-1C, various exemplary embodiments of photoluminescent structures 10 are shown, each capable of being coupled to a substrate 12, which may correspond to a vehicle fixture or vehicle related piece of equipment, such as a vehicle wireless charging system 28(FIG. 2). In FIG. 1A, the photoluminescent structure 10 is generally shown rendered as a coating (e.g., a film) that may be applied to a surface of the substrate 12. In FIG. 1B, the photoluminescent structure 10 is generally shown as a discrete particle capable of being integrated with a substrate 12. In FIG. 1C, the photoluminescent structure 10 is generally shown as a plurality of discrete particles that may be incorporated into a support medium 14 (e.g., a film) that may then be applied (as shown) or integrated with the substrate 12.

At the most basic level, a given photoluminescent structure 10 includes an energy conversion layer 16 that may include one or more sublayers, which are exemplarily shown through broken lines in FIGS. 1A and 1B. Each sublayer of the energy conversion layer 16 may include one or more photoluminescent materials 18 having energy converting elements with phosphorescent or fluorescent properties. Each photoluminescent material 18 may become excited upon receiving an excitation light 24 of a specific wavelength, thereby causing the light to undergo a conversion process. Under the principle of down conversion, the excitation light 24 is converted into a longer wavelength, converted light 26 that is outputted from the photoluminescent structure 10. Conversely, under the principle of up conversion, the excitation light 24 is converted into a shorter wavelength light that is outputted from the photoluminescent structure 10. When multiple distinct wavelengths of light are outputted from the photoluminescent structure 10 at the same time, the wavelengths of light may mix together and be expressed as a multicolor light.

Light emitted by a light source 76 (FIG. 5B) is referred to herein as excitation light 24 and is illustrated herein as solid arrows. In contrast, light emitted from the photoluminescent structure 10 is referred to herein as converted light 26 and is illustrated herein as broken arrows. The mixture of excitation light 24 and converted light 26 that may be emitted simultaneously is referred to herein as outputted light.

The energy conversion layer 16 may be prepared by dispersing the photoluminescent material 18 in a polymer matrix to form a homogenous mixture using a variety of methods. Such methods may include preparing the energy conversion layer 16 from a formulation in a liquid carrier support medium 14 and coating the energy conversion layer 16 to a desired substrate 12. The energy conversion layer 16 may be applied to a substrate 12 by painting, screen-printing, spraying, slot coating, dip coating, roller coating, and bar coating. Alternatively, the energy conversion layer 16 may be prepared by methods that do not use a liquid carrier support medium 14. For example, the energy conversion layer 16 may be rendered by dispersing the photoluminescent material 18 into a solid-state solution (homogenous mixture in a dry state) that may be incorporated in a polymer matrix, which may be formed by extrusion, injection molding, compression molding, calendaring, thermoforming, etc. The energy conversion layer 16 may then be integrated into a substrate 12 using any methods known to those skilled in the art. When the energy conversion layer 16 includes sublayers, each sublayer may be sequentially coated to form the energy conversion layer 16. Alternatively, the sublayers can be separately prepared and later laminated or embossed together to form the energy conversion layer 16. Alternatively still, the energy conversion layer 16 may be formed by coextruding the sublayers.

In some embodiments, the converted light 26 that has been down converted or up converted may be used to excite other photoluminescent material(s) 18 found in the energy conversion layer 16. The process of using the converted light 26 outputted from one photoluminescent material 18 to excite another, and so on, is generally known as an energy cascade and may serve as an alternative for achieving various color expressions. With respect to either conversion principle, the difference in wavelength between the excitation light 24 and the converted light 26 is known as the Stokes shift and serves as the principle driving mechanism for an energy conversion process corresponding to a change in wavelength of light. In the various embodiments discussed herein, each of the photoluminescent structures 10 may operate under either conversion principle.

Referring back to FIGS. 1A and 1B, the photoluminescent structure 10 may optionally include at least one stability layer 20 to protect the photoluminescent material 18 contained within the energy conversion layer 16 from photolytic and thermal degradation. The stability layer 20 may be configured as a separate layer optically coupled and adhered to the energy conversion layer 16. Alternatively, the stability layer 20 may be integrated with the energy conversion layer 16. The photoluminescent structure 10 may also optionally include a protective layer 22 optically coupled and adhered to the stability layer 20 or other layer (e.g., the conversion layer 16 in the absence of the stability layer 20) to protect the photoluminescent structure 10 from physical and chemical damage arising from environmental exposure. The stability layer 20 and/or the protective layer 22 may be combined with the energy conversion layer 16 through sequential coating or printing of each layer, sequential lamination or embossing, or any other suitable means.

Additional information regarding the construction of photoluminescent structures 10 is disclosed in U.S. Pat. No. 8,232,533 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," the entire disclosure of which is incorporated herein by reference. For additional information regarding fabrication and utilization of photoluminescent materials to achieve various light emissions, refer to U.S. Pat. No. 8,207,511 to Bortz et al., entitled "PHOTOLUMINESCENT FIBERS, COMPOSITIONS AND FABRICS MADE THEREFROM"; U.S. Pat. No. 8,247,761 to Agrawal et al., entitled "PHOTOLUMINESCENT MARKINGS WITH FUNCTIONAL OVERLAYERS"; U.S. Pat. No. 8,519,359 B2 to Kingsley et al., entitled "PHOTOLYTI- CALLY AND ENVIRONMENTALLY STABLE MULTI-LAYER STRUCTURE FOR HIGH EFFICIENCY ELECTROMAGNETIC ENERGY CONVERSION AND SUSTAINED SECONDARY EMISSION"; U.S. Pat. No. 8,664,624 B2 to Kingsley et al., entitled "ILLUMINATION DELIVERY SYSTEM FOR GENERATING SUSTAINED SECONDARY EMISSION"; U.S. Patent Publication No. 2012/0183677 to Agrawal et al., entitled "PHOTOLUMINESCENT COMPOSITIONS, METHODS OF MANUFACTURE AND NOVEL USES"; U.S. Pat. No. 9,057,021 to Kingsley et al., entitled "PHOTOLUMINESCENT OBJECTS"; and U.S. Patent Publication No. 2014/0103258 A1 to Agrawal et al., entitled "CHROMIC LUMINESCENT COMPOSITIONS AND TEXTILES," all of which are incorporated herein by reference in their entirety.

According to one embodiment, the photoluminescent material 18 may include organic or inorganic fluorescent dyes including rylenes, xanthenes, porphyrins, phthalocyanines. Additionally, or alternatively, the photoluminescent material 18 may include phosphors from the group of Ce-doped garnets such as YAG:Ce and may be a short persistence photoluminescent material 18. For example, an emission by $Ce^{3+}$ is based on an electronic energy transition from $5d^1$ to $4f^1$ as a parity allowed transition. As a result of this, a difference in energy between the light absorption and the light emission by $Ce^{3+}$ is small, and the luminescent level of $Ce^{3+}$ has an ultra-short lifespan, or decay time, of $10^{-8}$ to $10^{-7}$ seconds (10 to 100 nanoseconds). The decay time may be defined as the time between the end of excitation from the excitation light 24 and the moment when the light intensity of the converted light 26 emitted from the photoluminescent structure 10 drops below a minimum visibility of 0.32 mcd/m$^2$. A visibility of 0.32 mcd/m$^2$ is roughly 100 times the sensitivity of the dark-adapted human eye, which corresponds to a base level of illumination commonly used by persons of ordinary skill in the art.

According to one embodiment, a $Ce^{3+}$ garnet may be utilized, which has a peak excitation spectrum that may reside in a shorter wavelength range than that of conventional YAG:Ce-type phosphors. Accordingly, $Ce^{3+}$ has short persistence characteristics such that its decay time may be 100 milliseconds or less. Therefore, in some embodiments, the rare earth aluminum garnet type Ce phosphor may serve as the photoluminescent material 18 with ultra-short persistence characteristics, which can emit the converted light 26 by absorbing purple to blue excitation light 24 emitted from a light source 76. According to one embodiment, a ZnS:Ag phosphor may be used to create a blue converted light 26. A ZnS:Cu phosphor may be utilized to create a yellowish-green converted light 26. A $Y_2O_2S$:Eu phosphor may be used to create red converted light 26. Moreover, the aforementioned phosphorescent materials may be combined to form a wide range of colors, including white light. It will be understood that any short persistence photoluminescent material known in the art may be utilized without departing from the teachings provided herein. Additional information regarding the production of short persistence photoluminescent materials is disclosed in U.S. Pat. No. 8,163,201 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," the entire disclosure of which is incorporated herein by reference.

Additionally, or alternatively, the photoluminescent material 18, according to one embodiment, disposed within the photoluminescent structure 10 may include a long persistence photoluminescent material 18 that emits the converted light 26, once charged by the excitation light 24. The excitation light 24 may be emitted from any excitation source (e.g., any natural light sources 76, such as the sun, and/or any artificial light source 76). The long persistence photoluminescent material 18 may be defined as having a long decay time due to its ability to store the excitation light 24 and release the converted light 26 gradually, for a period of several minutes or hours, once the excitation light 24 is no longer present.

The long persistence photoluminescent material 18, according to one embodiment, may be operable to emit light at or above an intensity of 0.32 mcd/m$^2$ after a period of 10 minutes. Additionally, the long persistence photoluminescent material 18 may be operable to emit light above or at an intensity of 0.32 mcd/m$^2$ after a period of 30 minutes and, in some embodiments, for a period substantially longer than 60 minutes (e.g., the period may extend 24 hours or longer, and in some instances, the period may extend 48 hours). Accordingly, the long persistence photoluminescent material 18 may continually illuminate in response to excitation from any light sources 76 that emits the excitation light 24, including, but not limited to, natural light sources (e.g., the sun) and/or any artificial light source 76. The periodic absorption of the excitation light 24 from any excitation source may provide for a substantially sustained charge of the long persistence photoluminescent material 18 to provide for consistent passive illumination. In some embodiments, a light sensor may monitor the illumination intensity of the photoluminescent structure 10 and actuate an excitation source when the illumination intensity falls below 0.32 mcd/m$^2$, or any other predefined intensity level.

The long persistence photoluminescent material 18 may correspond to alkaline earth aluminates and silicates, for example doped di-silicates, or any other compound that is capable of emitting light for a period of time once the excitation light 24 is no longer present. The long persistence photoluminescent material 18 may be doped with one or more ions, which may correspond to rare earth elements, for example, $Eu^{2+}$, $Tb^{3+}$ and/or $Dy^3$. According to one non-limiting exemplary embodiment, the photoluminescent structure 10 includes a phosphorescent material in the range of about 30% to about 55%, a liquid carrier medium in the range of about 25% to about 55%, a polymeric resin in the range of about 15% to about 35%, a stabilizing additive in the range of about 0.25% to about 20%, and performance-enhancing additives in the range of about 0% to about 5%, each based on the weight of the formulation.

The photoluminescent structure 10, according to one embodiment, may be a translucent white color, and in some instances reflective, when unilluminated. Once the photoluminescent structure 10 receives the excitation light 24 of a particular wavelength, the photoluminescent structure 10 may emit any color light (e.g., blue or red) therefrom at any desired brightness. According to one embodiment, a blue emitting phosphorescent material may have the structure $Li_2ZnGeO_4$ and may be prepared by a high temperature solid-state reaction method or through any other practicable method and/or process. The afterglow may last for a duration of two to eight hours and may originate from the excitation light 24 and d-d transitions of $Mn^{2+}$ ions.

According to an alternate non-limiting exemplary embodiment, 100 parts of a commercial solvent-borne polyurethane, such as Mace resin 107-268, having 50% solids polyurethane in Toluene/Isopropanol, 125 parts of a blue green long persistence phosphor, such as Performance Indicator PI-BG20, and 12.5 parts of a dye solution containing 0.1% Lumogen Yellow F083 in dioxolane may be blended to yield a low rare earth mineral photoluminescent structure 10. It will be understood that the compositions provided herein are non-limiting examples. Thus, any phosphor known in the art may be utilized within the photoluminescent structure 10 without departing from the teachings provided herein. Moreover, it is contemplated that any long persistence phosphor known in the art may also be utilized without departing from the teachings provided herein.

Additional information regarding the production of long persistence photoluminescent materials is disclosed in U.S. Pat. No. 8,163,201 to Agrawal et al., entitled "HIGH-INTENSITY, PERSISTENT PHOTOLUMINESCENT FORMULATIONS AND OBJECTS, AND METHODS FOR CREATING THE SAME," the entire disclosure of which is incorporated herein by reference. For additional information regarding long persistence phosphorescent structures, refer to U.S. Pat. No. 6,953,536 to Yen et al., entitled "LONG PERSISTENT PHOSPHORS AND PERSISTENT ENERGY TRANSFER TECHNIQUE"; U.S. Pat. No. 6,117,362 to Yen et al., entitled "LONG-PERSISTENT BLUE PHOSPHORS"; and U.S. Pat. No. 8,952,341 to Kingsley et al., entitled "LOW RARE EARTH MINERAL PHOTOLUMINESCENT COMPOSITIONS AND STRUCTURES FOR GENERATING LONG-PERSISTENT LUMINESCENCE," all of which are incorporated herein by reference in their entirety.

Referring to FIG. 2, an exemplary vehicle charging system 28 showing a primary coil assembly 30 and a secondary coil assembly 32 for charging a vehicle power source, such as a battery 34, on a vehicle 36 wirelessly is illustrated. The primary coil assembly 30 may be part of a substantially stationary charging station 94 that is connected to an external power source 38 and includes a charging station interface 40. The vehicle 36 may include a rechargeable battery 34 and a rectifier assembly 42 attached thereto. The rectifier assembly 42 may be connected to the secondary coil assembly 32 and configured to transmit electrical current from the secondary coil assembly 32 to the battery 34 in order to charge the battery 34. The primary and secondary coil assemblies 30, 32 may each include at least one coil 52, 54 (FIG. 4). The coil 52 of the primary coil assembly 30 may be operably coupled, e.g. inductively, to a secondary coil 54 of the secondary coil assembly 32. As current flows through the primary coil 52, a magnetic field is generated. The energy emitted from the primary coil 52 may be received at the secondary coil 54, which is in turn used to charge the battery 34.

The vehicle charging system 28 may be used in public charging stations and/or in residential locations. The charging station 94 may be installed in parking lots, public garages, residential garages, residential driveways, etc., to enable frequent charging of electric powered vehicles 36 to improve the driving range and usability of the vehicle 36. The wireless power transfer is a contactless power transfer method utilizing inductive coupling between two magnetically coupled coil assemblies 30, 32. The quality of the magnetic coupling between a primary coil assembly 30 (e.g., charging station 94) and a secondary coil assembly 32 (e.g., vehicle coil assembly) is a factor in determining the overall system efficiency of the wireless charging system 28. It will be appreciated that the wireless charging system 28 described herein is an exemplary embodiment of a vehicle charging system 28 and that any vehicle charging system 28 will be within the scope of the present disclosure. Moreover, any wireless charging system 28 to be used in conjunction with the vehicle 36 is also within the scope of the present disclosure, such as inductive charging systems for an electronic device 178 (FIG. 10).

FIGS. 3A and 3B are exemplary embodiments of coupler assemblies illustrating main components of typical coupler topologies proposed for inductive wireless power transfer systems. The primary coil assembly 30 and the secondary coil assembly 32 may each include a backing plate 44, a ferrite pad 46, and a coil or coils 48 to produce magnetic fields from the power source 38 currents. The backing plate 44 may be constructed of aluminum or some other non-magnetic conductive material. The ferrite pad 46 may include a plurality of ferrite pads. The ferrite pad 46 may be configured to guide the magnetic flux through the coil(s) 48 and between the magnetic poles of the coupler, from which the fields enter/exit and are linked to the secondary coil assembly 32. The backing plate 44 may create a shield for a magnetic field created between the coupled coils 48. Such a shield may also improve coupling by directing the magnetic field towards the secondary coil assembly 32.

The coils 48 may include a copper winding coil arranged with the ferrite pad 46. The coils 48 may form a continuous ring-like shape defining a coil opening. For example, the coils 48 may form a circular shape, or may have straight sides forming a quadrilateral shape. The coils 48 may be formed from copper wire, according to one embodiment. As current is supplied to the coils 48, a magnetic field may be created between the primary coil assembly 30 and the secondary coil assembly 32. In another embodiment, a manufactured coupler pair may include capacitors integrated to a coupler package. In the manufactured coupler pair, couplers may also be enclosed with plastic packaging to provide protection.

Referring to FIG. 4, an exemplary embodiment of a solenoidal polarized coupler pair 50 having the secondary coil assembly 32 over the primary coil assembly 30 is illustrated. The coupler model 50 includes the primary coil assembly 30 having a winding coil 48 arrangement encircling the ferrite pad 46. The primary coil assembly 30 may create a magnetic field when current is applied to the primary coil 52. The secondary coil assembly 32 may be positioned over the primary coil assembly 30 to receive the energy emitted from the primary coil 52. The secondary coil assembly 32 may include a copper winding coil 54 and the ferrite pad 46. The secondary coil assembly 32 may include a non-magnetic highly conducting metal shield above the ferrite pad 46 to protect the vehicle 36 from the magnetic field created between the coupled coils 52, 54.

Figure 5A:
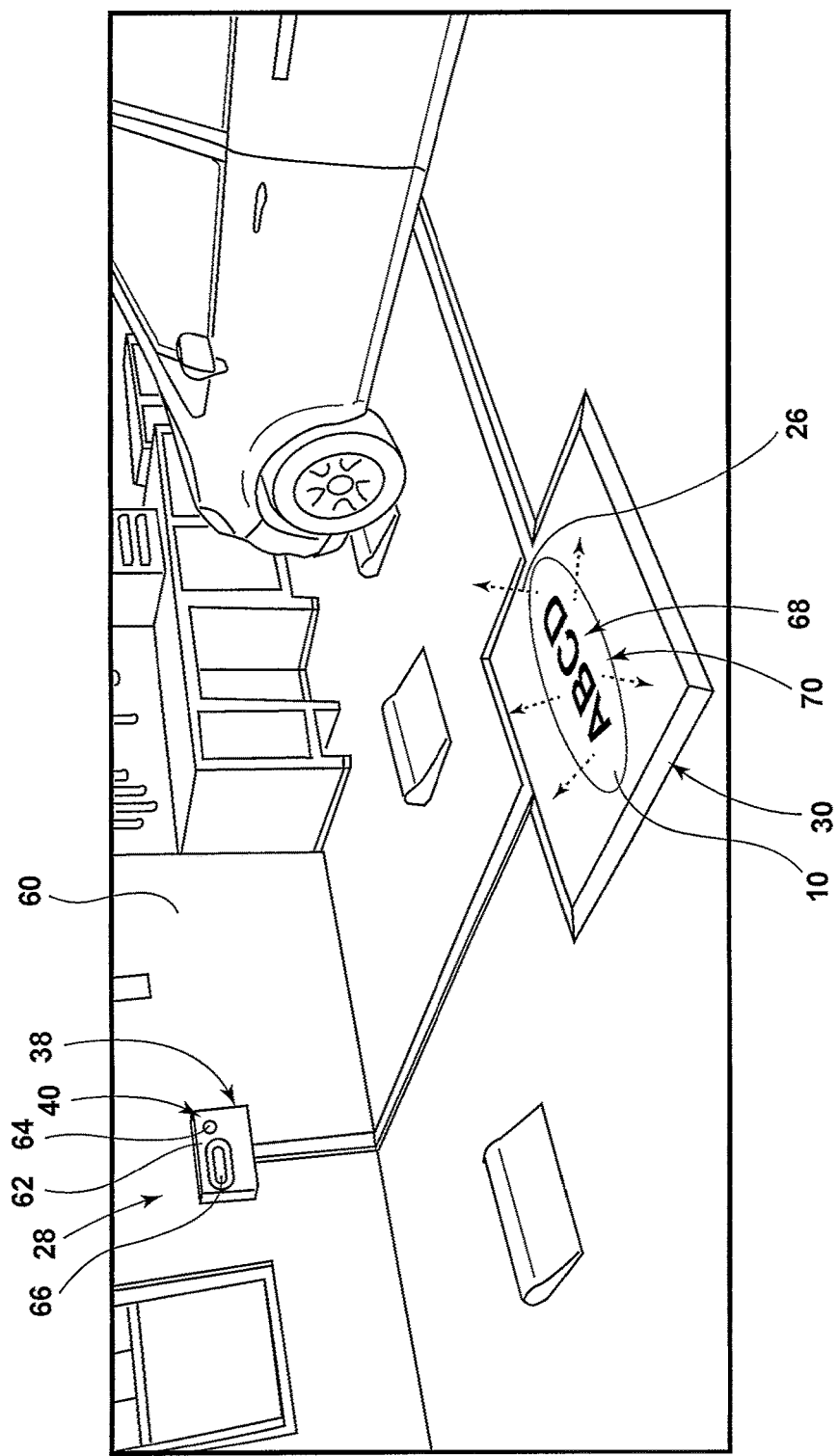
FIG. 5A is a rear perspective view of the primary coil assembly operatively coupled to a charging station interface having a passive illumination system disposed on a central portion thereof, according to one embodiment.
Figure 5B:
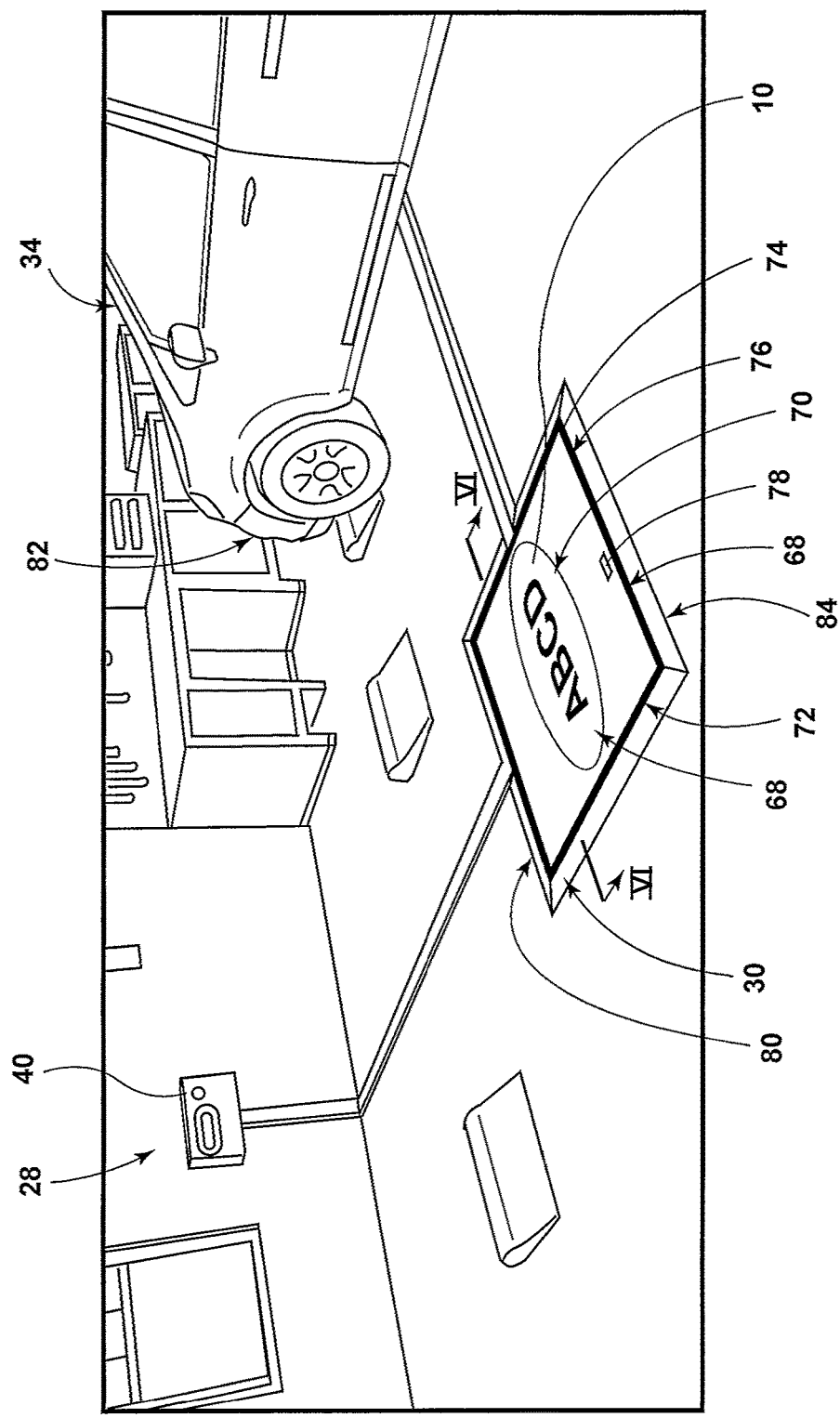
FIG. 5B is a rear perspective view of the primary coil assembly operatively coupled to the charging station interface having the passive illumination system disposed on a central portion thereof and an active illumination system disposed around a periphery of the primary coil assembly, according to one embodiment.

Referring to FIGS. 5A and 5B, the primary coil assembly 30 of the vehicle charging system 28 may include an external power source 38 and the charging station interface 40. As discussed above, the vehicle 36 may include the rechargeable battery 34 and the secondary coil assembly 32. As explained above, the secondary coil assembly 32 may, upon receiving electrical energy from an exterior power source, transmit electrical current to the battery 34. The secondary coil assembly 32 may receive the energy from the primary coil assembly 30 that is operably coupled with the external power source 38. Further, while the secondary coil assembly 32 and the primary coil assembly 30 are described as such herein, the secondary coil assembly 32 may also be configured as a transmitting coil and the primary coil assembly 30 may also be configured as a receiving coil.

The charging station interface 40 may be mounted to an existing wall 60 and may use an existing wall power conduit. The charging station interface 40 may also be a freestanding pedestal using an underground power source 38 for supplying power to the primary coil assembly 30. The power source 38 may be an alternating current (AC) power source, or may facilitate a connection to a power grid (not shown). The power source 38 may also connect, either directly or indirectly, to a renewable resource, such as a solar panel or wind turbine.

The charging station interface 40 may further include a control module 62, which may include one or more switches 64 for adjusting functions of the charging station 94. The control module 62 may further include a display 66. The display 66 may be a visual display device such as a liquid-crystal display (LCD) or any other type of display, including but not limited to, plasma displays, light emitting diode (LED) displays, etc.

With further reference to FIGS. 5A and 5B, according to one embodiment, the primary coil assembly 30 may further include an illumination assembly 68 therein and/or thereon. The illumination assembly 68 may include a passive illumination system 70 (FIG. 5A) and/or an active illumination system 72 (FIG. 5B).

With reference to FIG. 5A, the passive illumination system 70 may include a first photoluminescent structure 10 that may be configured to luminesce in response to excitation light 24. The luminescence exhibited by the passive illumination system 70 may provide one or more distinct lighting functions. For instance, the first photoluminescent structure 10 may luminesce in a first color to indicate the location of the primary coil 52. In another instance, the passive illumination system 70 may luminesce in a second color that is visually distinct from the first color to illuminate indicia such as an identifying mark of a vehicle manufacturer, or any other information that may be desirable to confer about the primary coil assembly 30 and/or the vehicle charging system 28.

According to one embodiment, the passive illumination system 70 may be disposed between the primary and secondary coils 52, 54 and/or within the magnetic field that is formed by the primary coil 52. The passive illumination system 70 within the magnetic field generated by the primary coil assembly 30 may not cause interruptions or negative implications on the charging performance of the vehicle charging system 28.

According to one embodiment, the first photoluminescent structure 10 incorporates a long persistence photoluminescent material 18 therein. According to one embodiment, the long persistence photoluminescent material 18 may be configured to emit converted light 26 for four hours or more upon receiving excitation light 24, as described above, or for any other desired duration of time.

With reference to FIG. 5B, the illumination assembly 68 additionally, or alternatively, includes an active illumination system 72 that includes a second photoluminescent structure 74 that is operably coupled with one or more light sources 76. The light sources 76 may be configured to emit excitation light 24 that causes the second photoluminescent structure 74 to luminesce in response to receiving the excitation light 24. According to one embodiment, the first photoluminescent structure 10 may emit converted light 26 of a first color (e.g., blue or white), while the second photoluminescent structure 74 may emit converted light 26 of a second color (e.g., green).

The light source 76 may include any form of light source. For example, fluorescent lighting, light emitting diodes (LEDs), organic LEDs (OLEDs), polymer LEDs (PLEDs), solid-state lighting, or any other form of lighting configured to emit light may be utilized. According to one embodiment, one or more light sources 76 may be configured to emit a wavelength of excitation light 24 that is characterized as ultraviolet light (~10-400 nanometers in wavelength), violet light (~380-450 nanometers in wavelength), blue light (~450-495 nanometers in wavelength), and/or infrared light (IR) (~700 nm-1 mm in wavelength) to take advantage of the relative low cost attributable to those types of LEDs.

With further reference to FIG. 5B, the charging station 94 may further include a light detecting device 78. The light detecting device 78 senses the environmental lighting conditions, such as whether the charging assembly is in day-like conditions (i.e., higher light level conditions) and/or whether the charging assembly is in night-like conditions (i.e., lower light level conditions). The light detecting device 78 also outputs a day-like signal when day-like conditions are detected, and the light detecting device 78 outputs a night-like signal when night-like conditions are detected. The light detecting device 78 can be of any suitable type, and can detect the day-like and night-like conditions in any suitable fashion. For instance, in one embodiment, the light detecting device 78 includes a light sensor that detects the amount of light (e.g., solar radiation) affecting the charging station 94 for determining whether day-like or night-like conditions exist.

The primary coil assembly 30 has a proximate side 80 that is closer to a front portion 82 of the vehicle 36 and a distal side 84 that is further from the front portion 82 of the vehicle 36. According to one embodiment, the light detecting device 78 is disposed proximately to the distal side 84 of the primary coil assembly 30 such that the light detecting device 78 senses the environmental conditions (e.g., the environmental light level) at one of the locations of the primary coil assembly 30 that is least susceptible to incident light 128 when the vehicle 36 is disposed over the primary coil assembly 30.

The intensity of light emitted from the light sources 76 may be adjusted based on the environmental condition detected by the light detecting device 78. For example, the light sources 76 may emit a higher intensity of the excitation light 24 therefrom when the light detecting device 78 senses day-like conditions and a lower intensity of the excitation light 24 when the light detecting device 78 senses night-like conditions.

According to one embodiment, the second photoluminescent structure 74 emits green converted light 26 due to the high sensitivity of the human eye to green light at low levels. Green converted light 26 may also provide a sufficient balance between day-like and night-like conditions.

It will be appreciated that the active illumination system 72 may additionally, or alternatively, include light sources 76 that emit the excitation light 24 in a visible range. Accordingly, some embodiments of the illumination assembly 68 described herein, may not include the first and/or second photoluminescent structures 10, 74. Rather, some embodiments may include one or more light sources 76 disposed on the primary coil assembly 30 and configured to emit the visible excitation light 24.

Figure 6:
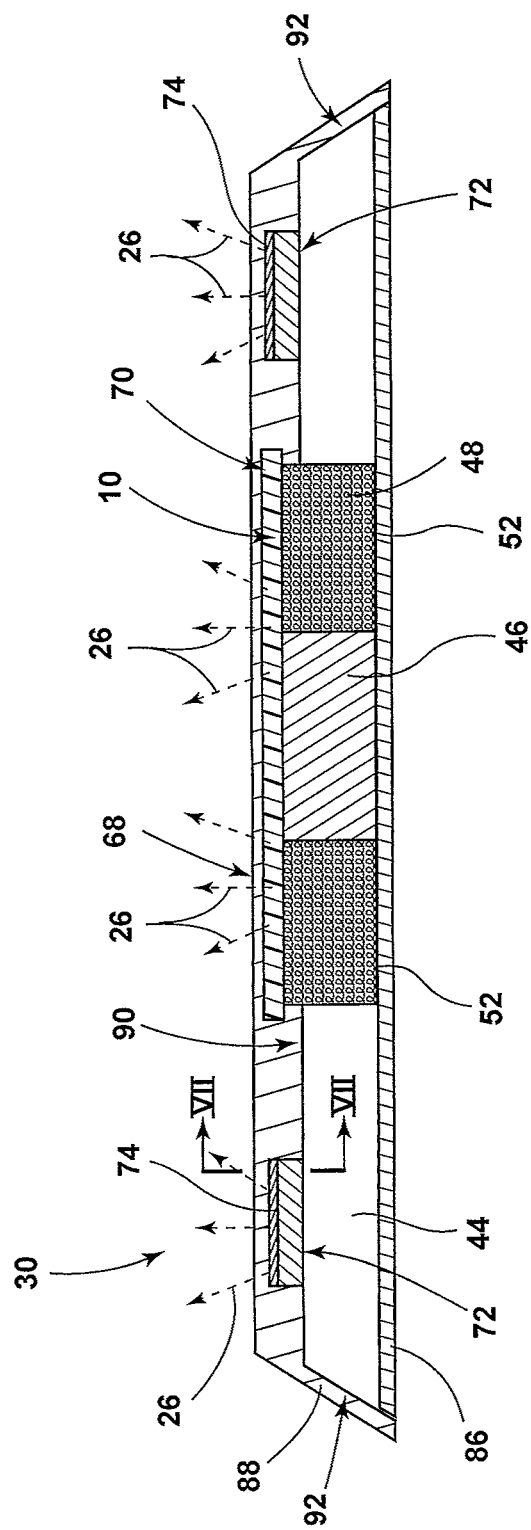
FIG. 6 is a cross-sectional view taken along the line VI-VI of FIG. 5B illustrating the primary coil assembly having the passive and active illumination systems therein.

Referring to FIG. 6, a cross-sectional view of the primary coil assembly 30 taken along the line VI-VI of FIG. 5B is illustrated. As shown in FIG. 6, the passive illumination system 70 includes the first photoluminescent structure 10 and is disposed over the primary coil. The active illumination system 72 is disposed outwardly of the passive illumination system 70 and includes the second photoluminescent structure 74. As discussed above, the passive illumination system 70 may be illuminated without disturbing the magnetic field formed by the primary coil. The second photoluminescent structure 74 may be operably coupled with light sources 76 and configured to emit the excitation light 24 and/or the converted light 26 in accordance with pre-defined events. For example, the active illumination system 72 may illuminate whenever the light detecting device 78 senses an abrupt change in lighting conditions, anytime a night-like condition is sensed, when the passive illumination system 70 is in an unilluminated state, when the charging station interface 40 is utilized by a user, etc.

A base material 86 may be disposed on a bottom portion of the primary coil assembly 30. The base material 86 may have non-conductive properties. Additionally, or alternatively, the base material 86 may have a high static frictional coefficient (e.g., above 0.3 $\mu_s$) to assist in maintaining a constant position of the primary coil assembly 30 on the ground, or whatever other surface the primary coil assembly 30 is disposed on.

An overmold material 88 may be disposed around a top surface 90 and/or one or more side surfaces 92 of the primary coil assembly 30 and above the illumination system. The overmold material 88 may protect the light-producing assembly 100 from physical and chemical damage arising from environmental exposure. The overmold material 88 may have viscoelasticity (i.e., having both viscosity and elasticity), a low Young's modulus, and/or a high failure strain compared with other materials so that the overmold material 88 may protect the illumination assembly 68 when contact is made thereto. For example, the overmold material 88 may protect the light-producing assembly 100 from the environmental containments, such as dirt and water that may come in contact with the primary coil assembly 30.

The overmold material 88 may continue to have flexible properties at low temperatures, such as temperatures below 0 degrees Celsius. The overmold material 88 may further be resistant to UV light provided by natural light sources and substantially resistant to weathering. Moreover, the overmold material 88 may sufficiently seal the top surface 90 and/or side surfaces 92 of the primary coil assembly 30. According to one embodiment, the overmold material 88 may be formed from a material containing silicone therein.

Figure 7A:
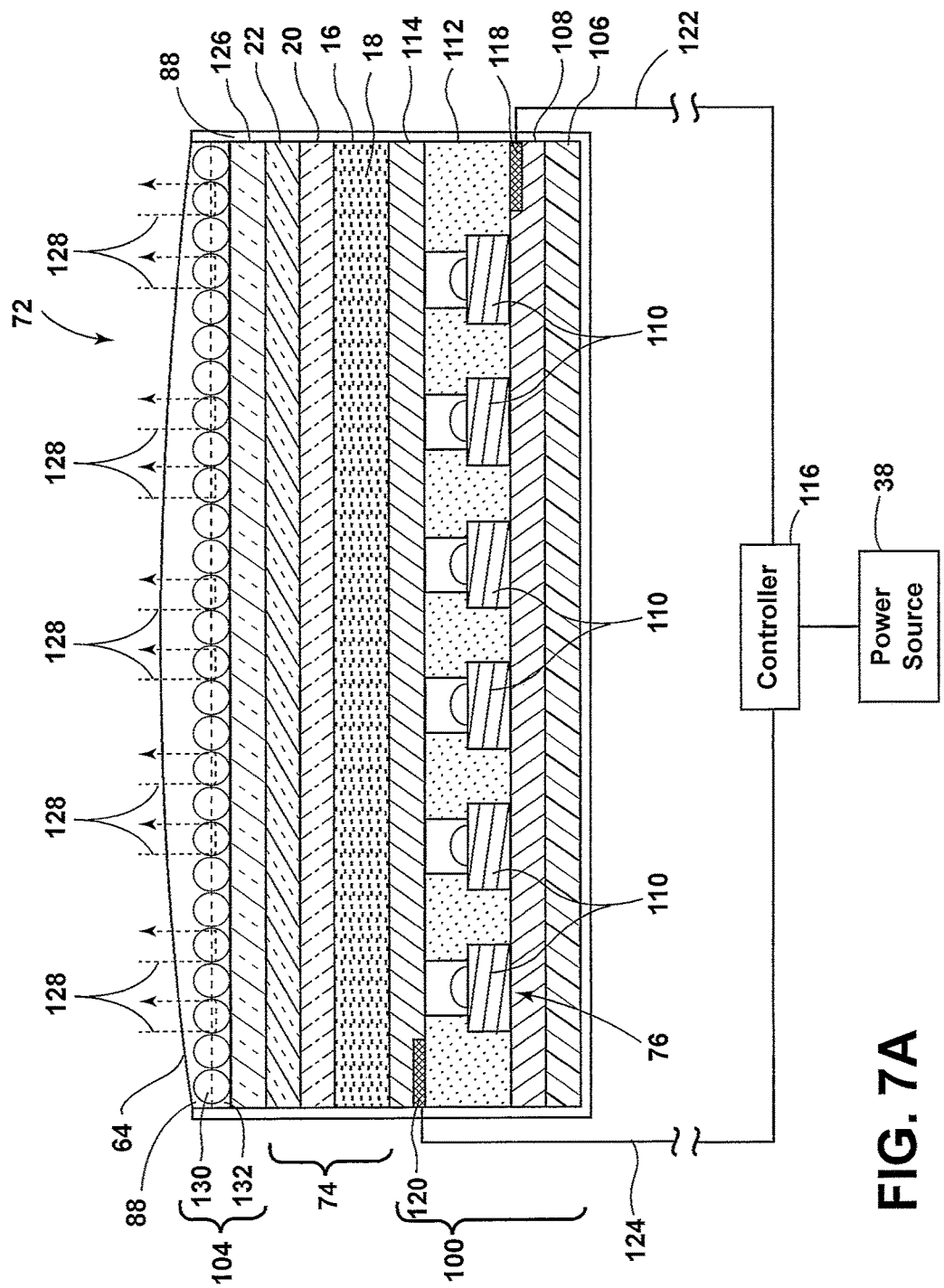
FIG. 7A is a cross-sectional view taken along line VII-VII of FIG. 6 illustrating a light source according to one embodiment.

Referring to FIGS. 7A-7E, a cross-sectional view of the light source 76 capable of use with an external photoluminescent structure 74 is shown according to one embodiment taken along the line VI-VI of FIG. 1. As illustrated in FIG. 7A, the active illumination system 72 includes the light source 76, which may have a stacked arrangement that includes a light-producing assembly 100, the second photoluminescent structure 74, a viewable portion 102, a reflective layer 104, and the overmold material 88. It should be appreciated that the viewable portion 102 and the overmold material 88 may be two separate components, or may be integrally formed as a single component. It will also be appreciated that come embodiments mat not include all components shown in FIGS. 7A-7E.

The light-producing assembly 100 may correspond to a thin-film or printed light emitting diode (LED) assembly and includes a substrate 106 as its lowermost layer. The substrate 106 may include a polycarbonate, poly-methyl methacrylate (PMMA), or polyethylene terephthalate (PET) material on the order of 0.005 to 0.060 inches thick and is arranged over the intended vehicle substrate on which the light source 76 is to be received (e.g., the backing plate 44). Alternatively, as a cost saving measure, the substrate 106 may directly correspond to a preexisting structure (e.g., the backing plate 44, etc.).

The light-producing assembly 100 includes a positive electrode 108 arranged over the substrate 106. The positive electrode 108 includes a conductive epoxy such as, but not limited to, a silver-containing or copper-containing epoxy. The positive electrode 108 is electrically connected to at least a portion of a plurality of LED sources 110 arranged within a semiconductor ink 112 and applied over the positive electrode 108. Likewise, a negative electrode 114 is also electrically connected to at least a portion of the LED sources 110. The negative electrode 114 is arranged over the semiconductor ink 112 and includes a transparent or translucent conductive material such as, but not limited to, indium tin oxide. Additionally, each of the positive and negative electrodes 108, 114 are electrically connected to a controller 116 and the power source 38 via a corresponding bus bar 118, 120 and conductive leads 122, 124. The bus bars 118, 120 may be printed along opposite edges of the positive and negative electrodes 108, 114 and the points of connection between the bus bars 118, 120 and the conductive leads 122, 124 may be at opposite corners of each bus bar 118, 120 to promote uniform current distribution along the bus bars 118, 120. It should be appreciated that in alternate embodiments, the orientation of components within the light-producing assembly 100 may be altered without departing from the concepts of the present disclosure. For example, the negative electrode 114 may be disposed below the semiconductor ink 112 and the positive electrode 108 may be arranged over the aforementioned semiconductor ink 112. Likewise, additional components, such as the bus bars 118, 120 may also be placed in any orientation such that the light-producing assembly 100 may emit converted light 26 towards a desired location.

The LED sources 110 may be dispersed in a random or controlled fashion within the semiconductor ink 112 and may be configured to emit focused or non-focused light toward the second photoluminescent structure 74. The LED sources 110 may correspond to micro-LEDs of gallium nitride elements on the order of about 5 to about 400 microns in size and the semiconductor ink 112 may include various binders and dielectric material including, but not limited to, one or more of gallium, indium, silicon carbide, phosphorous, and/or translucent polymeric binders.

The semiconductor ink 112 can be applied through various printing processes, including ink jet and silk screen processes to selected portion(s) of the positive electrode 108. More specifically, it is envisioned that the LED sources 110 are dispersed within the semiconductor ink 112, and shaped and sized such that a substantial quantity of the LED sources 110 (e.g., over 50%) align with the positive and negative electrodes 108, 114 during deposition of the semiconductor ink 112. The portion of the LED sources 110 that ultimately are electrically connected to the positive and negative electrodes 108, 114 may be illuminated by a combination of the bus bars 118, 120, controller 116, power source 38, and conductive leads 122, 124. Additional information regarding the construction of light-producing assemblies is disclosed in U.S. Pat. No. 9,299,887 to Lowenthal et al. entitled "ULTRA-THIN PRINTED LED LAYER REMOVED FROM SUBSTRATE," the entire disclosure of which is incorporated herein by reference.

Referring still to FIG. 7A, the second photoluminescent structure 74 is arranged over the negative electrode 114 as a coating, layer, film or other suitable deposition. With respect to the presently illustrated embodiment, the second photoluminescent structure 74 may be arranged as a multi-layered structure including an energy conversion layer 16, optional stability layer 20, and optional protective layer 22, as described above.

In some embodiments, a decorative layer 126 may be disposed between the viewable portion 102 and the second photoluminescent structure 74. However, the decorative layer 126 may be disposed in any other location within the illumination assembly 68 in alternate embodiments. The decorative layer 126 may include a polymeric material or any other suitable material and is configured to control or modify an appearance of the viewable portion 102. For example, the decorative layer 126 may be configured to confer a metallic appearance to the viewable portion 102. The metallic appearance can be disposed rearwardly of the viewable portion 102 through any method known in the art, including, but not limited to, sputter deposition, vacuum deposition (vacuum evaporation coating), electroplating, or directly printing onto a component of the illumination assembly 68. The metallic appearance may be chosen from a wide range of reflective materials and/or colors, including, but not limited to, silver, chrome, copper, bronze, gold, or any other metallic surface. Additionally, an imitator of any metallic material may also be utilized without departing from the teachings provided herein.

In other embodiments, the decorative layer 126 may be tinted any color to complement the vehicle structure on which the illumination assembly 68 is to be received. In any event, the decorative layer 126 may be at least partially light transmissible such that the converted light 26 is not prevented from illuminating the viewable portion 102.

A reflective layer 104 may also be disposed above the second photoluminescent structure 74. The reflective layer 104 may include clear, translucent, and/or opaque portions and may be colored any desired color. The reflective layer 104 may include any retroreflective material that generally functions to reflect incident light 128 that is directed from the environment proximate the illumination assembly 68 towards the viewable portion 102.

The reflective layer 104 may be reflective and/or retroreflective. Accordingly, in embodiments where the reflective layer 104 has reflective properties, the incident light 128 may be spread, refracted, and/or scattered as the incident light 128 passes therethrough. In embodiments where the reflective layer 104 has retroreflective properties, the incident light 128 directed towards the reflective layer 104 may redirect the incident light 128 in a substantially similar direction to the direction at which the incident light 128 approached the reflective layer 104.

According to one embodiment, the reflective layer 104 is configured as a plurality of beads 130. The beads 130 may be formed from a glass material, a polymeric material, any other practicable material, and/or a combination thereof. In some embodiments, a portion of the beads 130 may be a first material (e.g., a glass) and a second portion of the beads 130 may be a second material (e.g., a polymeric material). The beads 130 may have a solid construction, or may be hollow. In embodiments where the beads 130 have a hollow core, the internal void may include any type of material, solid, liquid, or gas, without departing from the teachings provided herein. It will be appreciated that in alternate embodiments, retroreflective materials other than beads may be utilized within the reflective layer without departing from the teachings provided herein.

According to one embodiment, the material within the beads 130 may have a different refractive index than the material of the beads 130. The beads 130 may have a substantially spherical shape, an oblong shape, an irregular shape, or combinations thereof. The beads 130 may range in size from about 60 µm (0.0024 inches) to about 850 µm (0.034 inches). The bead 130 size may be expressed in terms of U.S. Sieve Number, or the size of mesh screen that a bead 130 will pass through. For example, a U.S. Sieve Number 20 will permit beads with a diameter of 840 µm (0.033 inches) or less to pass through the mesh, whereas a U.S. Sieve Number 200 mesh will allow those beads 130 of 74 µm (0.0029 inches) or less to pass. According to one embodiment, the beads 130 may be chosen from 20 to 200 U.S. Sieve Number. The beads 130, according to one embodiment, are substantially mono dispersed in size and/or shape. According to an alternate embodiment, the beads 130 may be configured in a variety of sizes and/or shapes that are randomly distributed within a light transmissive adhesive layer 132.

According to one embodiment, the reflective layer 104 may contain over 10, 100 or 1000 beads 130 per square foot that are bonded to the light-producing assembly 100 within the transmissive adhesive layer 132. The beads 130 and/or adhesive layer 132 may be printed onto the light-producing assembly 100. Instead of scattering light, the beads 130 may reflect incident light 128 (e.g., ambient light) and redirect the incident light 128 away from the light-producing assembly 100 thereby creating reflective characteristics. For the beads 130 to retroreflect light, the beads 130 may be partially transparent and substantially round. However, it will be understood that the beads may be translucent and/or any other shape without departing from the teachings provided herein.

The transparency of the glass beads 130 may allow incident light 128, or ambient light, to pass into and be subsequently redirected out of the beads 130. As the incident light 128 enters the beads 130, it may be bent (refracted) by the rounded surface of the beads 130 to a point below where the beads 130 are embedded in an adhesive layer 132. The incident light 128 striking the back of the beads 130 surface, which is embedded within the adhesive layer 132, may then be reflected outwardly in a substantially convergent direction to which the incident light 128 entered the beads 130, with only a small fraction of the light going back toward the second photoluminescent structure 74 and/or the light-producing assembly 100. In some embodiments, the decorative layer and the adhesive layer 132 may be a single layer.

The glass beads 130 may be applied to the second photoluminescent structure 74 and/or the light-producing assembly 100 in a premixed solution, disposed into the wet adhesive layer 132, dropped onto a premixed two-part epoxy or thermoplastic material, and/or through any other process known in the art. According to one embodiment, the glass beads 130 may be embedded to greater than about 10%, 20%, 30%, 40%, 50% or 60% of the diameter of the beads 130. In other words, a portion of the beads may protrude from the adhesive layer 132. It will be understood that multiple contiguous layers of beads 130 may be utilized within the paint such that some beads 130 are completely surrounded by the adhesive layer 132 while other beads 130 protrude. The depth of the beads 130 within the adhesive layer 132 may be consistent across the illumination assembly 68 or may vary across the illumination assembly 68 such that certain areas are highlighted. In some embodiments, it may be desired to provide a consistent quality of both beads 130 and adhesive layer 132 thickness to promote even retroreflectivity along the illumination assembly 68.

The retroreflected light from the glass beads 130 may be a function of three variables including the index of refraction of the glass beads 130; the bead 130 shape, size, and surface characteristics; and the number of beads 130 present and exposed to incident light 128. The bead's 130 Refractive Index (RI) is a function of the chemical makeup of the beads 130. The higher the RI, the more incident light 128 that is retroreflected. According to one embodiment, the beads 130 disposed on the light-producing assembly 100 have a refractive index in the range of 1 to 2.

The viewable portion 102 is arranged over the second photoluminescent structure 74. In some embodiments, the overmold material 88 is molded over the reflective layer 104, the second photoluminescent structure 74, and/or the light-producing assembly 100. Preferably, the viewable portion 102 should be at least partially light transmissible. In this manner, the viewable portion 102 will be illuminated by the second photoluminescent structure 74 whenever an energy conversion process is underway and/or whenever the LED sources are illuminated. Additionally, by over-sealing the viewable portion 102, it may also function to protect the second photoluminescent structure 74 and the light-producing assembly 100. The viewable portion 102 may be arranged in a planar shape and/or an arcuate shape to enhance its viewing potential. Like the second photoluminescent structure 74 and the light-producing assembly 100, the viewable portion 102 may also benefit from a thin design, thereby helping to fit the light source 76 into small package spaces.

In some embodiments, the second photoluminescent structure 74 may be employed separate and away from the light-producing assembly 100. For example, the second photoluminescent structure 74 may be positioned on a rim, a tire, a window, and/or any surface proximate, but not in physical contact with, the light-producing assembly 100. It should be understood that in embodiments where the second photoluminescent structure 74 is incorporated into distinct components separated from the light source 76, the light source 76 might still have the same or similar structure to the light source 76 described in reference to FIG. 7A.

Figure 7B:
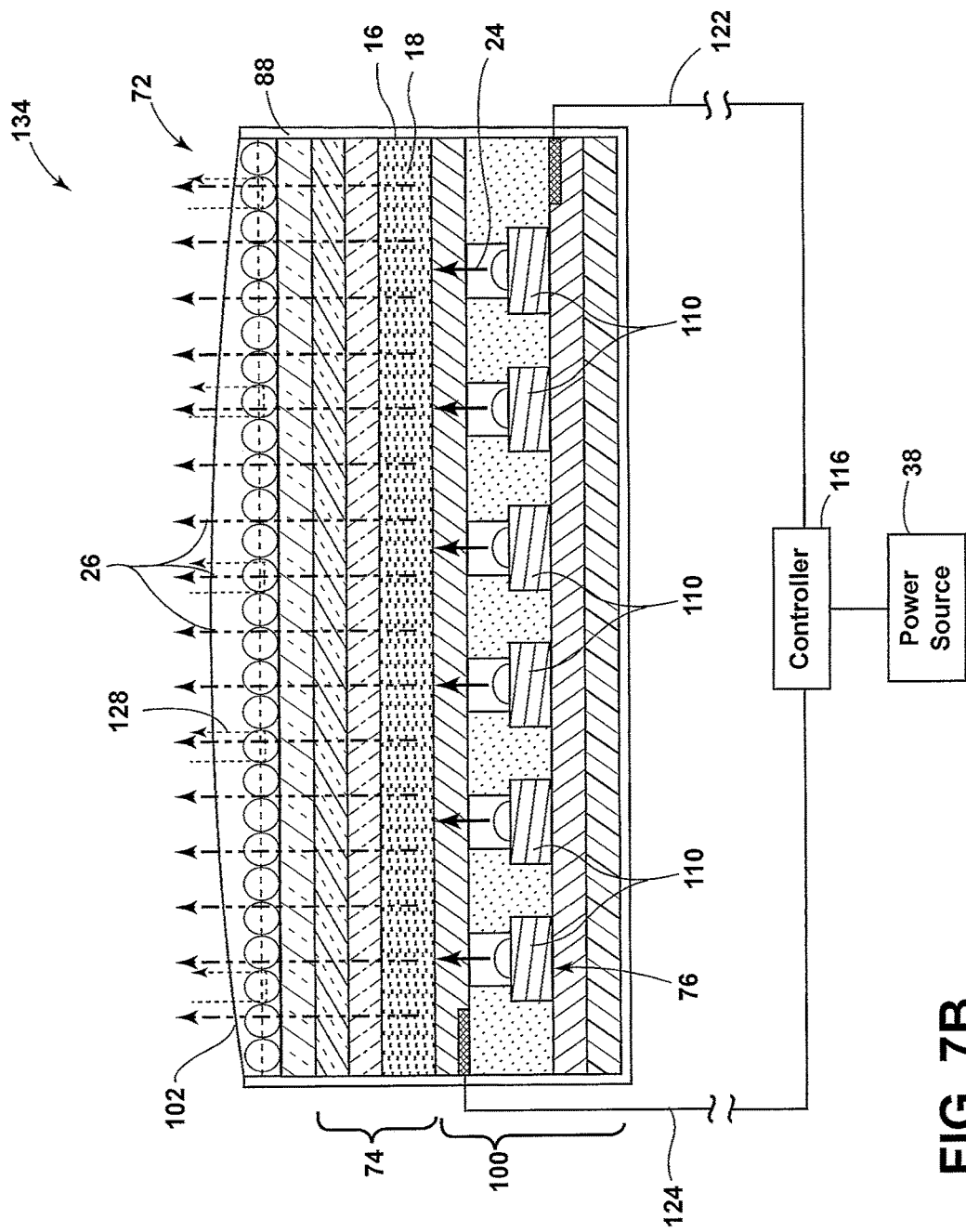
FIG. 7B is a cross-sectional view taken along line VII-VII of FIG. 6 further illustrating an the light source, according to one embodiment.

Referring to FIG. 7B, an energy conversion process 134 for producing single color luminescence is illustrated according to one embodiment. For purposes of illustration, the energy conversion process 134 is described below using the light source 76 depicted in FIG. 7A. In this embodiment, the energy conversion layer 16 of the second photoluminescent structure 74 includes a single photoluminescent material 18, which is configured to convert the excitation light 24 received from LED sources 110 into an converted light 26 having a wavelength different than that associated with the excitation light 24. More specifically, the photoluminescent material 18 is formulated to have an absorption spectrum that includes the emission wavelength of the excitation light 24 supplied from the LED sources 110. The photoluminescent material 18 is also formulated to have a Stokes shift resulting in the visible converted light 26 having an emission spectrum expressed in a desired color, which may vary per lighting application. The visible converted light 26 is outputted from the light source 76 via the viewable portion 102, thereby causing the viewable portion 102 to illuminate in the desired color. The illumination provided by the viewable portion 102 may offer a unique, substantially uniform, and/or attractive viewing experience that may be difficult to duplicate through non-photoluminescent means.

Figure 7C:
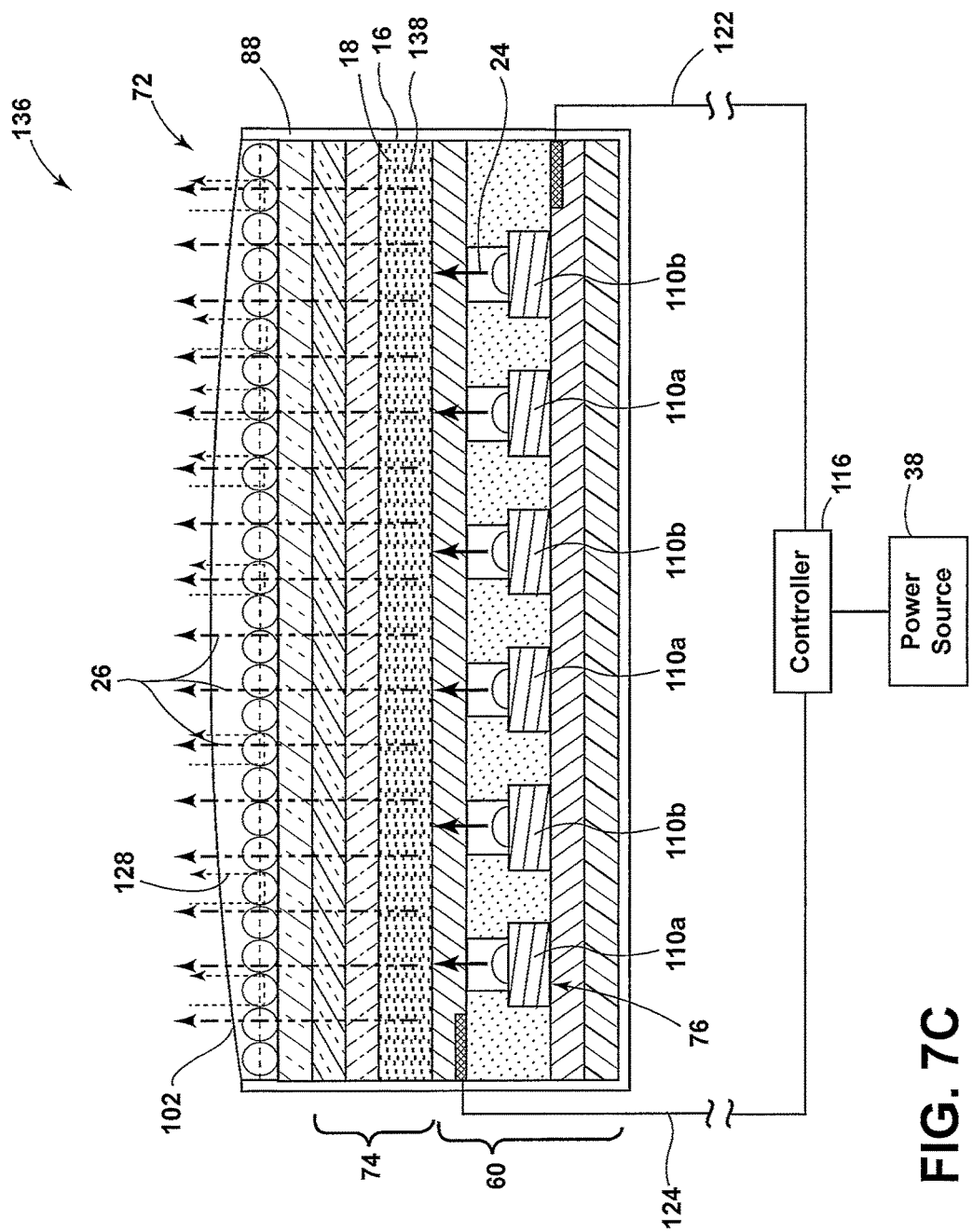
FIG. 7C is a cross-sectional view taken along line VII-VII of FIG. 6 illustrating an alternate light source, according to one embodiment.

Referring to FIG. 7C, a second energy conversion process 136 for generating multiple colors of light is illustrated according to one embodiment. For consistency, the second energy conversion process 136 is also described below using the light source 76 depicted in FIG. 7A. In this embodiment, the energy conversion layer 16 includes the first and second photoluminescent materials 18, 138 that are interspersed within the energy conversion layer 16. Alternatively, the photoluminescent materials 18, 138 may be isolated from each other if desired. Also, it should be appreciated that the energy conversion layer 16 may include more than two different photoluminescent materials 18 and 138, in which case, the teachings provided below similarly apply. In one embodiment, the second energy conversion process 136 occurs by way of down conversion using blue, violet, and/or UV light as the source of excitation.

With respect to the presently illustrated embodiment, the excitation of photoluminescent materials 18, 138 is mutually exclusive. That is, photoluminescent materials 18, 138 are formulated to have non-overlapping absorption spectrums and Stoke shifts that yield different emission spectrums. Also, in formulating the photoluminescent materials 18, 138, care should be taken in choosing the associated Stoke shifts such that the converted light 26 emitted from one of the photoluminescent materials 18, 138, does not excite the other, unless so desired. According to one exemplary embodiment, a first portion of the LED sources 110, exemplarily shown as LED sources 110*a*, is configured to emit an excitation light 24 having an emission wavelength that only excites photoluminescent material 18 and results in the excitation light 24 being converted into a converted light 26 of a first color (e.g., white). Likewise, a second portion of the LED sources 110, exemplarily shown as LED sources 110*b*, is configured to emit an excitation light 24 having an emission wavelength that only excites second photoluminescent material 138 and results in the excitation light 24 being converted into a converted light 26 of a second color (e.g., red). Preferably, the first and second colors are visually distinguishable from one another. In this manner, LED sources 110*a* and 110*b* may be selectively activated using the controller 116 to cause the second photoluminescent structure 74 to luminesce in a variety of colors. For example, the controller 116 may activate only LED sources 110*a* to exclusively excite photoluminescent material 18, resulting in the viewable portion 102 illuminating in the first color. Alternatively, the controller 116 may activate only LED sources 110*b* to exclusively excite the second photoluminescent material 138, resulting in the viewable portion 102 illuminating in the second color.

Alternatively still, the controller 116 may activate LED sources 110*a* and 110*b* in concert, which causes both of the photoluminescent materials 18, 138 to become excited, resulting in the viewable portion 102 illuminating in a third color, which is a color mixture of the first and second color (e.g., pinkish). The intensities of the excitation light 24 emitted from each light source 76 may also be proportionally varied to one another such that additional colors may be obtained. For energy conversion layers 16 containing more than two distinct photoluminescent materials 18, a greater diversity of colors may be achieved. Contemplated colors include red, green, blue, and combinations thereof, including white, all of which may be achieved by selecting the appropriate photoluminescent materials 18 and correctly manipulating the corresponding LED sources 110.

Figure 7D:
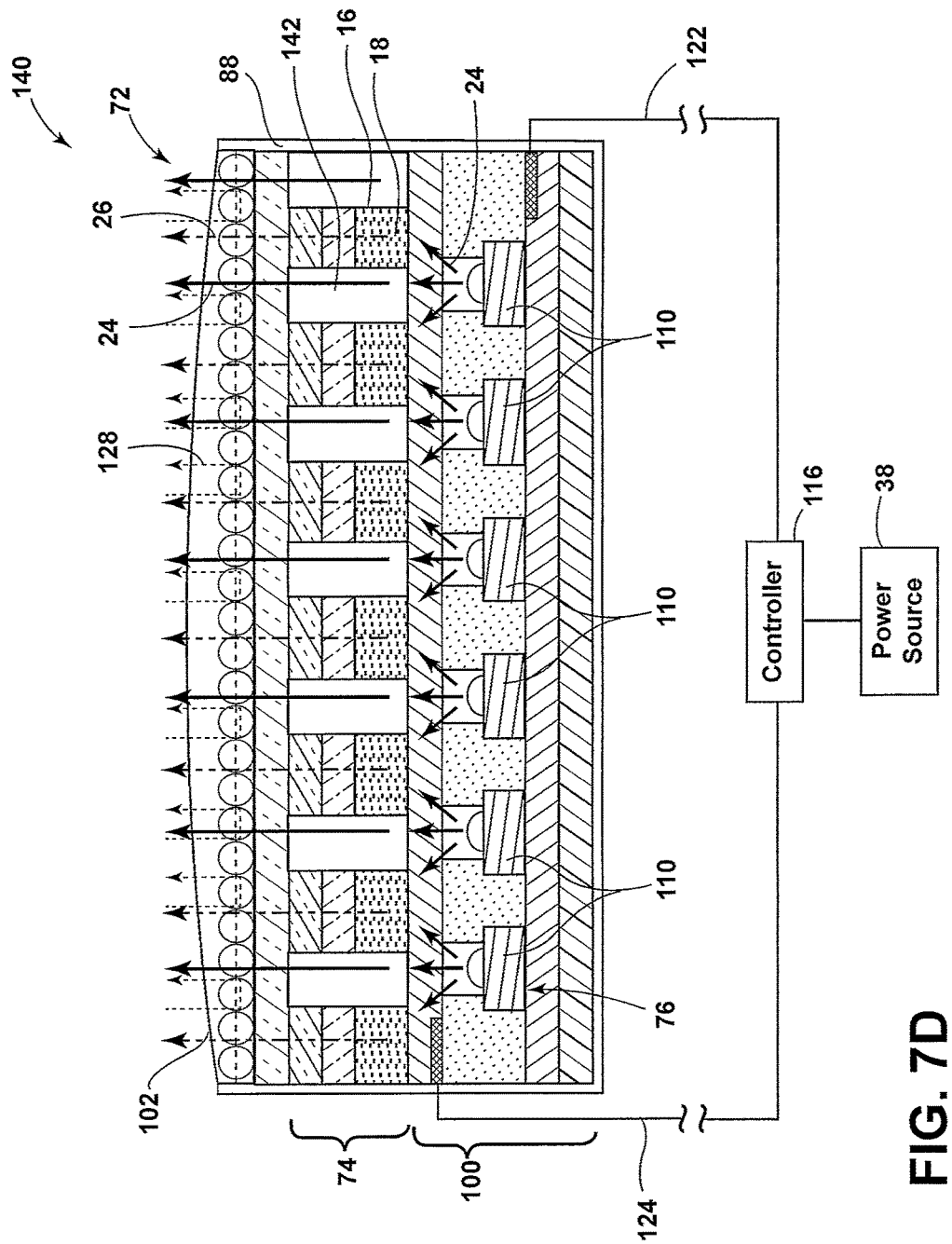
FIG. 7D is a cross-sectional view taken along line VII-VII of FIG. 6 illustrating a light source having a luminescent structure separated by light transmissive portions disposed on the light source, according to one embodiment.

Referring to FIG. 7D, a third energy conversion process 140 includes a light-producing assembly 100, such as the one described in reference to FIG. 7A, and a photoluminescent material 138 disposed thereon is illustrated, according to an alternate embodiment. The photoluminescent material 138 is configured to convert excitation light 24 received from LED sources 110 into a converted light 26 having a wavelength different than that associated with the excitation light 24. More specifically, the second photoluminescent structure 74 is formulated to have an absorption spectrum that includes the emission wavelength of the excitation light 24 supplied from the LED sources 110. The photoluminescent material 18 is also formulated to have a Stokes shift resulting in the converted light 26 having an emission spectrum expressed in a desired color, which may vary per lighting application.

The second photoluminescent structure 74 may be applied to a portion of the light-producing assembly 100, for example, in a stripped manner. Between the photoluminescent structures 10 may be light transmissive portions 142 that allow excitation light 24 emitted from the LED sources 110 to pass therethrough at the first wavelength. The light transmissive portions 142 may be an open space, or may be a transparent or translucent material. The excitation light 24 emitted through the light transmissive portions 142 may be directed from the light-producing assembly 100 towards an additional photoluminescent structure disposed proximate to the light-producing assembly 100. The additional photoluminescent structure may be configured to luminesce in response to the excitation light 24 that is directed through the light transmissive portions 142.

Figure 7E:
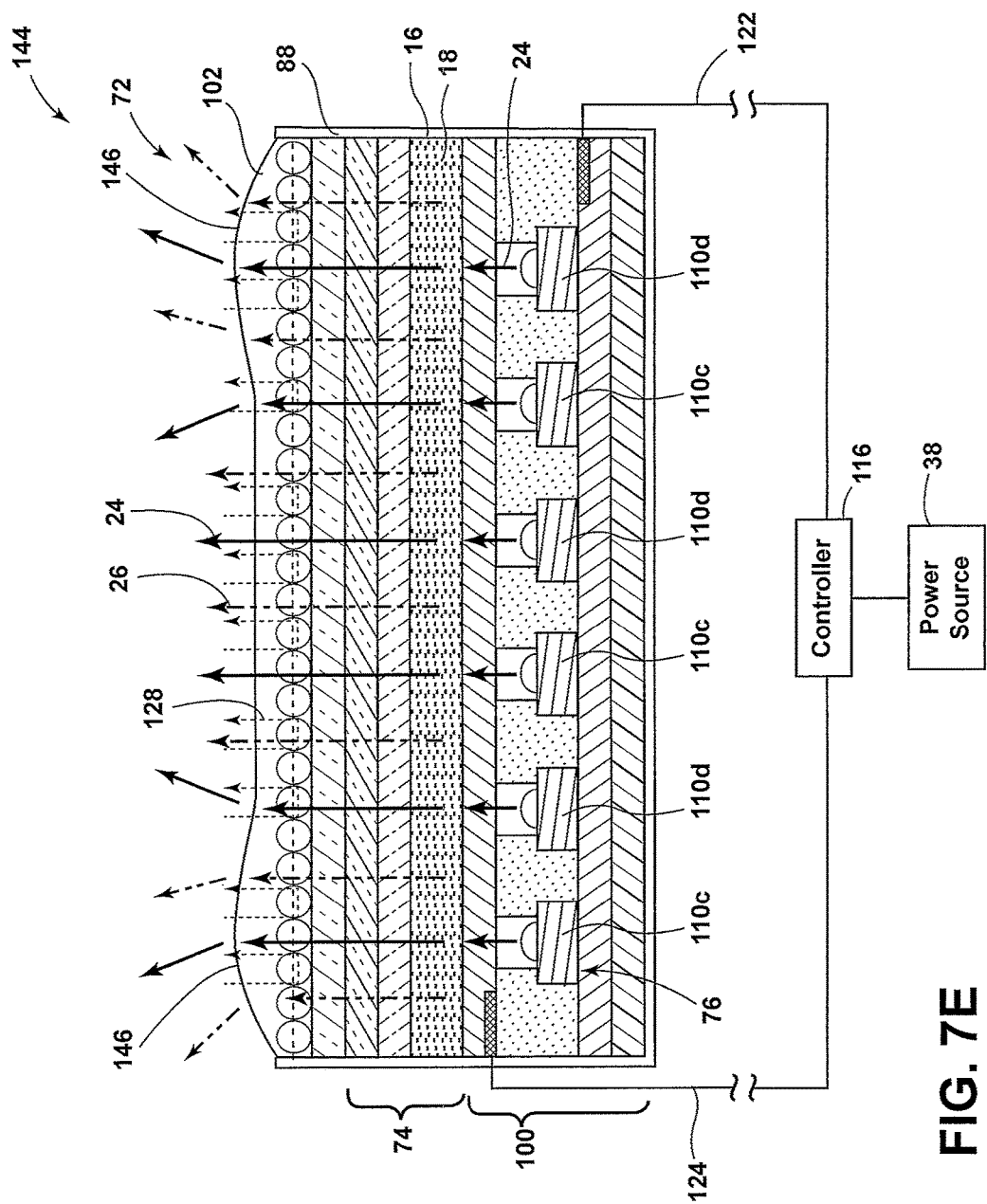
FIG. 7E is a cross-sectional view taken along line VII-VII of FIG. 6 illustrating an alternate light source having a luminescent structure disposed on the light source configured to convert a portion of light emitted from the light source from a first wavelength to a second wavelength, according to one embodiment.

Referring to FIG. 7E, a fourth energy conversion process 144 for generating multiple colors of light utilizing the light-producing assembly 100, such as the one described in reference to FIG. 7A, and a second photoluminescent structure 74 disposed thereon is illustrated. In this embodiment, the second photoluminescent structure 74 is disposed over a top portion of the light-producing assembly 100. The excitation of photoluminescent material 18 is formulated such that a portion of excitation light 24 emitted from the LED sources 110 passes through the second photoluminescent structure 74 at the first wavelength (i.e., the excitation light 24 emitted from the light source 76 is not converted by the second photoluminescent structure 74). The intensity of the outputted light (i.e., the combination of the excitation light 24 and converted light 26) may be modified by pulse-width modulation or current control to vary the amount of excitation light 24 emitted from the LED sources 110 that passes through the second photoluminescent structure 74 without converting to a second wavelength of converted light 26. For example, if the light source 76 is configured to emit excitation light 24 at a low level, substantially all of the excitation light 24 may be converted to converted light 26. In this configuration, a color of converted light 26 corresponding to the second photoluminescent structure 74 may be emitted from the light-producing assembly 100. If the light source 76 is configured to emit excitation light 24 at a high level, only a portion of the first wavelength may be converted by the second photoluminescent structure 74. In this configuration, a first portion of the outputted light may be converted by the second photoluminescent structure 74 and a second portion of the outputted light may be emitted from the light-producing assembly 100 at the first wavelength towards additional photoluminescent structures disposed proximately to the light source 76. The additional photoluminescent structures may luminesce in response to the excitation light 24 emitted from the light source 76.

According to one exemplary embodiment, a first portion of the LED sources 110, exemplarily shown as LED sources 110a is configured to emit an excitation light 24 having a wavelength that excites the photoluminescent material 18 within the second photoluminescent structure 74 and results in the excitation light 24 being converted into a converted light 26 of a first color (e.g., white). Likewise, a second portion of the LED sources 110, exemplarily shown as LED sources 110c, is configured to emit an excitation light 24 having a wavelength that passes through the second photoluminescent structure 74 and excites additional photoluminescent structures disposed proximately to the illumination assembly 68 thereby illuminating in a second color. The first and second colors may be visually distinguishable from one another. In this manner, LED sources 110a and 110c may be selectively activated using the controller 116 to cause the illumination assembly 68 to luminesce in a variety of colors.

The light-producing assembly 100 may also include optics 146 that are configured to direct excitation light 24 emitted from the LED sources 110a, 110c and the converted light 26 emitted from the second photoluminescent structure 74 towards pre-defined locations. For example, excitation light 24 emitted from the LED sources 110a, 110c and the second photoluminescent structure 74 may be directed and/or focused towards the ground and/or a location proximate to the illumination assembly 68.

Figure 8:
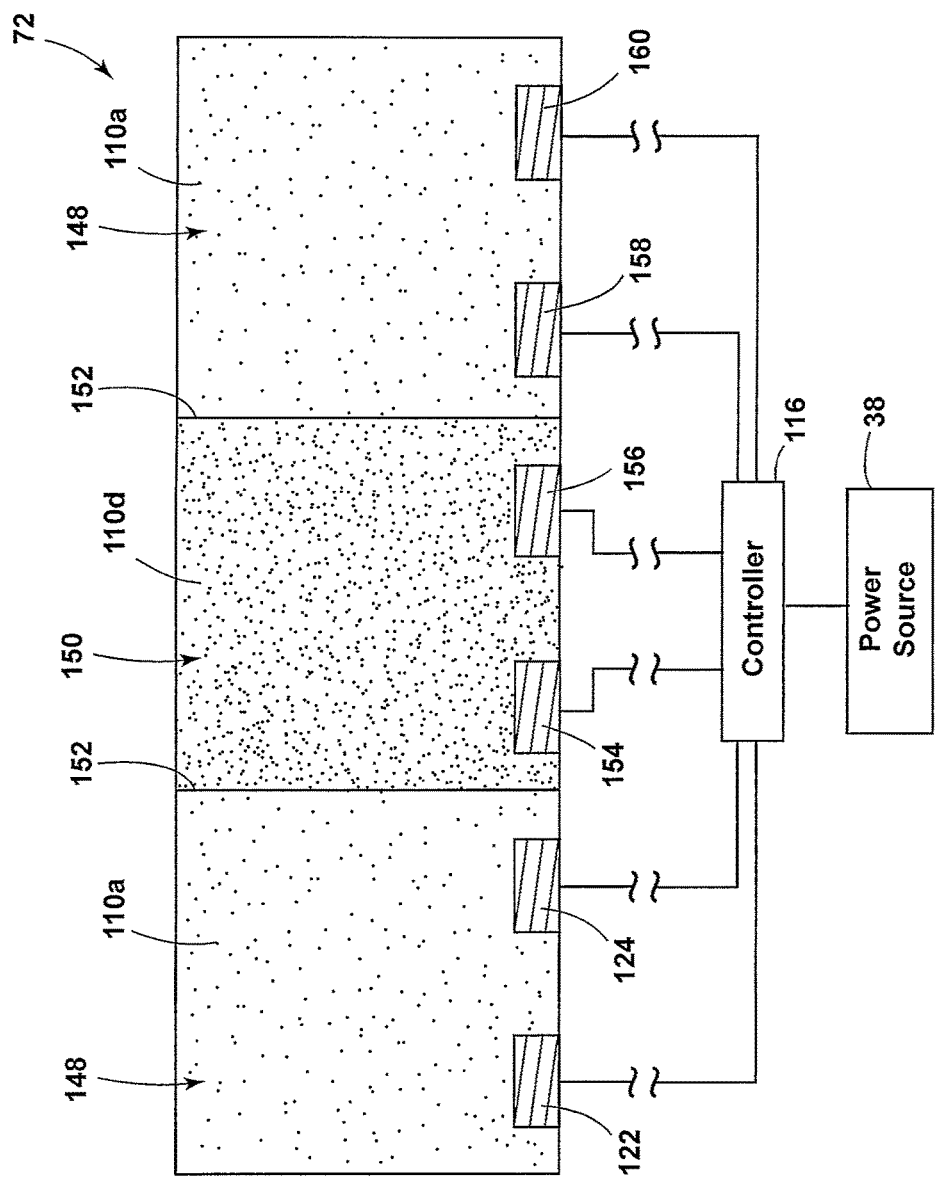
FIG. 8 illustrates a top view of a light-producing assembly, according to one embodiment, having varying types and concentrations of LED sources transversely along the light-producing assembly.

Referring to FIG. 8, a light-producing assembly 100, according to one embodiment, is illustrated from a top view having varying types and concentrations of LED sources 110a, 110d transversely along the light-producing assembly 100. As illustrated, a first portion 148 of the light-producing assembly 100 includes LED sources 110a that are configured to emit an excitation light 24 having an emission wavelength in a first color (e.g., red) spectrum. Likewise, a second portion 150 of the light-producing assembly 100 includes LED sources 110d that are configured to emit an excitation light 24 having an emission wavelength in a second color (e.g., yellow) spectrum. The first and second portions 148, 150 of the light-producing assembly 100 may be separated by insulative, or non-conductive, barriers 152 from proximately disposed portions through any means known in the art such that each portion 148, 150 may be illuminated independently of any other portion 148, 150. The insulative barriers 152 may also prevent a substantial amount of excitation light 24 emitted from proximately illuminated LED sources 110a, 110d from crossing through the insulative barrier 152. Further, each portion 148, 150 disposed within the light-producing assembly 100 may include a respective bus bar 118, 120, 154, 156, 158, 160 coupled to the controller 116 and configured to illuminate each respective portion 148, 150.

According to one embodiment, the first and second colors are visually distinguishable from one another. In this manner, LED sources 110a and 110d may be selectively activated using the controller 116 to cause the LED sources 110a, 110d to illuminate in a variety of colors. For example, the controller 116 may activate only LED sources 110a to exclusively illuminate a portion 148 of the light-producing assembly 100 in the first color. Alternatively, the controller 116 may activate only LED sources 110d to exclusively illuminate a portion 150 of the light-producing assembly 100 in the second color. It should be appreciated that the light-producing assembly 100 may include any number of portions 148, 150 having varying LED sources 110a, 110d that may illuminate in any desired color. Moreover, it should also be appreciated that the portions having varying LED sources 110a, 110d may be orientated in any practicable manner and need not be disposed adjacently.

As described above, a second photoluminescent structure 74 may be disposed on a portion of the light-producing assembly 100. If desired, any of the LED sources 110a, 110d may be utilized for exciting any photoluminescent material 18 disposed proximately to and/or above the light-producing assembly 100.

The semiconductor ink 112 may also contain various concentrations of LED sources 110a, 110d such that the concentration of the LED sources 110a, 110d, or number of LED sources 110a, 110d per unit area, may be adjusted for various lighting applications. In some embodiments, the concentration of LED sources 110a, 110d may vary across the length of the light-producing assembly 100. For example, a first portion 148 of the light-producing assembly 100 may have a greater concentration of LED sources 110 than alternate portions 150, or vice versa. In such embodiments, the light source 76 and/or the indicia may appear brighter or have a greater luminance in order to preferentially illuminate pre-defined locations. In other embodiments, the concentration of LED sources 110a, 110d may increase or decrease with increasing distance from a preselected point.

According to one embodiment, the light-producing assembly 100 includes a higher concentration of LED sources 110a in the second portion 150 such that the second portion 150 may illuminate as a side marker, or turn indicator, while the first portion 148 provides ambient lighting.

Figure 9:
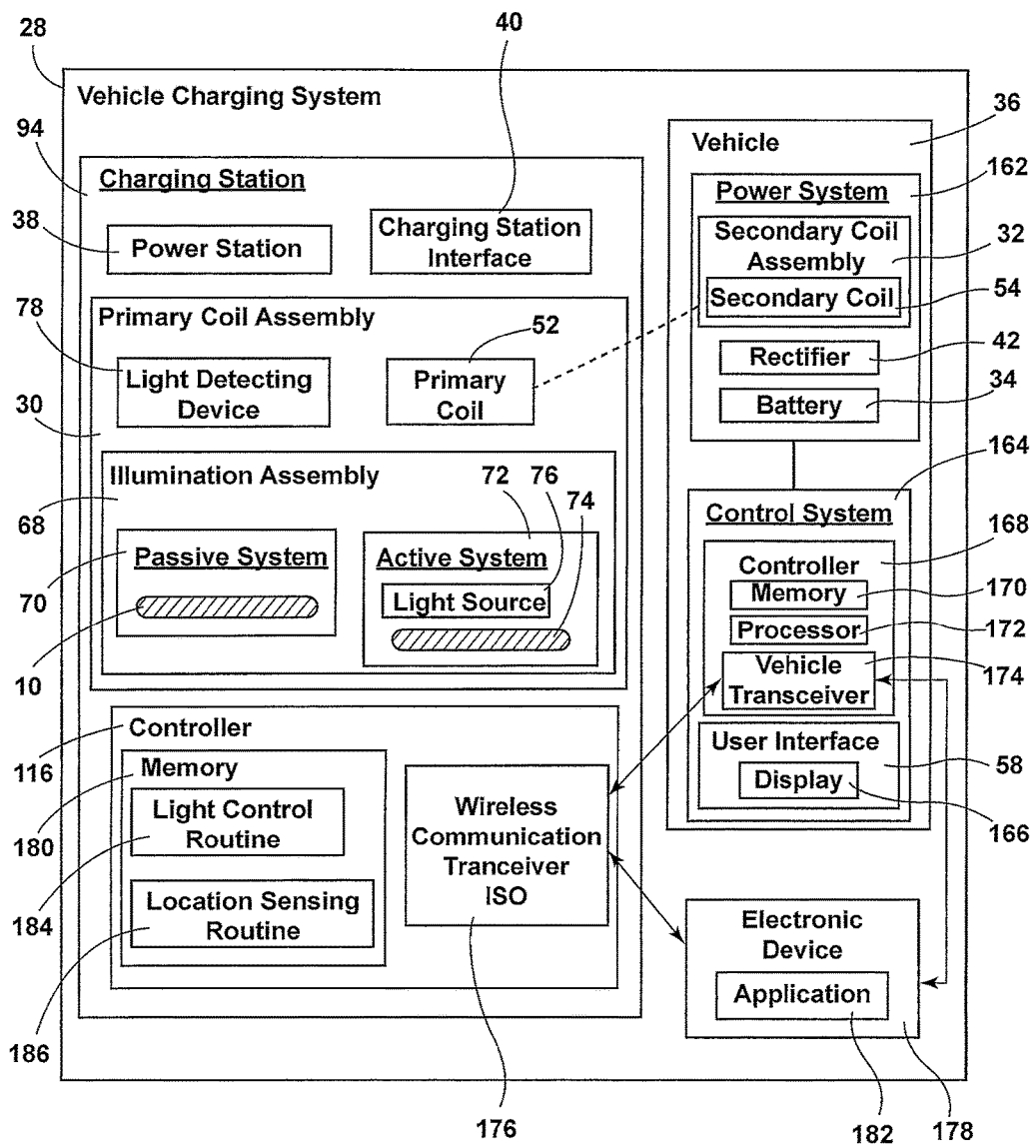
FIG. 9 is a block diagram illustrating the vehicle charging system having the charging station, the vehicle, and an electronic device that may communicate with the charging station and vehicle, according to one embodiment.

Referring to FIG. 9, a block diagram of the vehicle charging system 28 is shown in which the illumination assembly 68 is disposed within the primary coil assembly 30. However, it will be appreciated that the illumination assembly 68 described herein may additionally be placed on or within the vehicle 36 without departing from the scope of the present disclosure. The illumination assembly 68 may provide illumination for notifying a driver moving the vehicle 36 into the charging station 94 of the location of the primary coil assembly 30.

As explained above, the charging station 94 includes the power source 38 coupled to the primary coil assembly 30 and provides electrical power to energize the secondary coil assembly 32. The secondary coil assembly 32, which may be disposed within a power system 162 of the vehicle 36, is operably coupled with the rectifier assembly 42, which is operably coupled to an energy-stored source on the vehicle 36, such as the battery 34.

The vehicle 36 may further include a control system 164 that is operably coupled with the power system 162 of the vehicle 36. The control system 164 may include a user interface 58 having a display 166 and a controller 168 coupled to the user interface 58. The display 166 may be mounted in the vehicle 36 and arranged to be viewed by a driver of the vehicle 36 so that the controller 168 can present information to the driver via the display 166. The information may include charging settings, charging status, vehicle orientation in relation to the primary coil assembly 30, etc.

According to one embodiment, the controller 168 includes a memory 170, a processor 172, and a vehicle transceiver 174. The memory 170 contains instructions for operation of the controller 168. The processor 172 is coupled to the memory 170 and is configured to execute the instructions contained in the memory 170. The vehicle transceiver 174 is coupled to processor 172 and is configured to send messages to and receive messages from the processor 172.

With further reference to FIG. 9, the illumination assembly 68, and/or the vehicle 36, may further include one or more of the wireless communication transceivers 174, 176 that may be configured to interact with an electronic device 178. The wireless communication transceivers 174, 176 may communicate with the electronic device 178 over a wireless signal (e.g., radio frequency). In one non-limiting example, the wireless communication transceivers 174, 176 may be a Bluetooth™ RN4020 module, or an RN4020 Bluetooth™ low energy PICtail board configured to communicate with the electronic device 178 using Bluetooth™ low energy signals. The wireless communication transceivers 174, 176 may include a transmitter and a receiver to transmit and receive wireless signals (e.g., Bluetooth™ signals) to and from the electronic device 178, to and from the illumination assembly 68 and/or to and from the vehicle 36. It will be appreciated that the wireless communication transceivers 174, 176 may utilize other forms of wireless communication between with the electronic device 178 and other wireless communication transceivers 174, 176 such as Wi-Fi™.

The wireless communication transceivers 174, 176 may be positioned on or within the controllers 116, 168. The controllers 116, 168 may be a dedicated controller or may be a shared controller (e.g., for multiple light assemblies). The controllers 116, 168 may include a processor and a memory 180 for executing stored routines or for storing information (e.g., related to the operation of the illumination assembly 68, the charging station 94, and/or the electronic device 178). The wireless communication transceiver 174 is configured to communicate with the processor such that one or more of the routines stored in the memory 180 is activated.

The electronic device 178 may include one or more routines, which control the communication between the wireless communication transceiver 174 and the electronic device 178. For example, in mobile phone embodiments of the electronic device 178, the mobile phone may include one or more applications 182 configured to communicate with the wireless communication transceivers 174, 176. In the depicted embodiment, the memory 180 of the controller 116 includes a light control routine 184 and a location sensing routine 186. In various embodiments, the wireless communication transceivers 174, 176 are a standalone device that is not in communication with other components of the charging station 94, and/or any feature of the vehicle 36. For example, the wireless communication transceivers 174, 176 may only be capable of communication with the illumination assembly 68 and the electronic device 178. In other embodiments, the wireless communication transceivers 174, 176 may communicate with the vehicle 36, other onboard controllers of the vehicle 36, and/or the charging station interface 40.

The vehicle 36, and/or the charging station 94, may include a plurality of wireless communication transceivers 174, 176 that may be in communication with one another or may mutually communicate with a master controller or module (e.g., body control module of the vehicle 36). The wireless communication transceivers 174, 176 may be disposed within other accessories of the vehicle 36 or the charging station 94, or may be stand alone units. The electronic device 178 may communicate with all, some, or none of the wireless communication transceivers 174, 176 as the electronic device 178 enters and exits the communication range of the transceivers 174, 176. Each of the wireless communication transceivers 174, 176 may be aware of its location within the vehicle 36 and capable of sharing its location with the electronic device 178.

In various embodiments, the wireless communication transceivers 174, 176 are capable of communicating with the electronic device 178 such that the location of the electronic device 178 may be determined therefrom (e.g., based on signal strength and/or return time of the signal) or vice versa. According to one embodiment, the location sensing routine 186 in the memory 180 of the controllers 116, 168 may utilize the signal strength and time to return of the signals between the plurality of wireless communication transceivers 174, 176 and the electronic device 178 to triangulate the position of the electronic device 178 as an occupant moves around and inside and/or outside of the vehicle 36. In embodiments where the wireless communication transceivers 174, 176 communicate with a master module, the location of the electronic device 178 may be calculated in the master module. The location of the electronic device 178 may have sufficient resolution to determine the orientation of the vehicle 36 in relation to the primary coil assembly 30 and display information relating thereto on the electronic device 178 and/or the vehicle display 166. It will be understood that the location sensing routine 186 may be located on the electronic device 178, the vehicle 36, and/or the charging station 94 and that any location determinations may be made by the electronic device 178 and shared with the wireless communication transceivers 174, 176 without departing from the spirit of this disclosure.

The light control routine 184 may process signals from the wireless communication transceivers 174, 176 (e.g., the location of the electronic device 178 and/or the vehicle 36) to activate the illumination assembly 68. Depending on the signals received from the wireless communication transceiver 174 and/or the vehicle sensors, the light control routine 184 may be activated. The light control routine 184 may store one or more predetermined illumination sequences for the illumination assembly 68 based on detected properties of the electronic device 178 (e.g., known or unknown device, location, and user specific data) and/or the vehicle position. For example, the light control routine 184 may control the illumination assembly 68 to follow the electronic device 178 by activating an illumination sequence based on the position of the electronic devices 178. The electronic device 178 may store user specific data and preferences relating to the illumination assembly 68 (e.g., color, intensity, pattern, activation distance, etc.) and/or the memory 180 (e.g., the light control routine 184) may store this data. Additionally, or alternatively, the illumination assembly 68 may illuminate in a first color when the vehicle 36 is not over the primary coil assembly 30 and in a second color when the vehicle 36 is sufficiently disposed over the primary coil assembly 30 to initiate the vehicle charging sequence.

Choosing which electronic devices 178 should be trusted, and, therefore, given access to command of the controller(s) 116 and/or the wireless communication transceiver 174 (e.g., the illumination assembly 68 and/or the vehicle 36) may be determined based on whether the electronic device 178 has been inside of the vehicle 36 before. The memory of the wireless communication transceivers 174, 176 may store identifying information relating to electronic devices 178 which were detected within the vehicle 36 (e.g., using the location sensing routine 186) and which may therefore be generally regarded as "friendly" and/or as the owner of the vehicle 36.

In an exemplary method of determining that an unknown electronic device 178 is friendly, the wireless communication transceivers 174, 176 detect the presence of an unknown electronic device 178, detect a characteristic signal shift (e.g., attenuation or increase in signal at corresponding wireless communication transceivers 174, 176) indicative of the unknown electronic device 178 entering or being within the vehicle 36 across multiple wireless communication transceivers 174, 176, and store characteristic information about the electronic device 178 for future identification. It will be understood that a determination of the location of the electronic device 178 to be within the vehicle 36 may also prompt a storing of the characteristic information about the electronic device 178 for future identification. Utilizing the past and/or present location of the electronic device 178 as a security feature to determine if it is allowed access to the controllers 116, 168 may be particularly advantageous as the replication of signal shifting indicative of the electronic device 178 entering the vehicle 36 and the location of the electronic device 178 is particularly difficult to fake. Further, it will be understood that more conventional methods of connecting electronic devices 178, such as pairing and manually connecting, may also be utilized to designate friendly devices 178.

Detection of location of the electronic device 178 relative to the vehicle 36 also permits the wireless communication transceivers 174, 176 to determine if an unrecognized electronic device 178 is proximate the vehicle 36. Such an unrecognized electronic device 178 may be owned or carried by a potential burglar or threat to the vehicle 36. According to one embodiment, the illumination assembly 68 may illuminate in a pre-defined sequence in response. For example, the active illumination system 72 may emit excitation light 24 and/or converted light 26 at a high intensity is such situations.

In events where an unrecognized electronic device 178 is detected proximate the vehicle 36 for greater than a predetermined time, the wireless communication transceivers 174, 176 may activate one or more counter measures. Countermeasures may include a strobe light from the illumination assembly 68 or directing light from the electronic device 178. In some embodiments, any available identifying information about the electronic device 178 may be stored for later retrieval if the owner of the vehicle's electronic device 178 is not detected proximate the vehicle 36 at the same time. The wireless communication transceivers 174, 176 may store greater than fifty electronic devices 178 that may have been a threat. Finally, the use of the illumination assembly 68 on the vehicle 36 may allow for a plurality of lighting solutions to be provided for the reversing or backing up of the vehicle 36. For example, the shifting of the vehicle 36 into a reverse gear may cause activation of the illumination assembly 68 to provide greater illumination for the driver or for a backup camera of the vehicle 36.

Referring still to FIG. 9, in operation, each photoluminescent structure 10, 74 may exhibit a constant unicolor or multicolor illumination. For example, the passive illumination system 70 may be disposed above the primary coil and, in some embodiments, contain a long persistence photoluminescent material 18 therein. The passive illumination system 70 may illuminate locations on the primary coil assembly 30 that have magnetic fields proximately located thereto. The passive illumination, in some embodiments, is configured to have a negligible effect, if any, on the magnetic field generated by the primary coil.

Additionally, or alternatively, the controller 116 may be coupled with the active illumination system 72 and may prompt the light source 76 to emit only a first wavelength of excitation light 24 via the LED sources 110 to cause the second photoluminescent structure 74 to illuminate in the first color (e.g., amber). Alternatively, the controller 116 may prompt the light source 76 to emit only a second wavelength of excitation light 24 via the LED sources 110 to cause the second photoluminescent structure 74 to illuminate in the second color (e.g., red). Alternatively still, the controller 116 may prompt the light source 76 to simultaneously emit the first and second wavelengths of excitation light 24 to cause the second photoluminescent structure 74 to illuminate in a third color (e.g., pinkish) defined by an additive light mixture of the first and second colors. Moreover, additional photoluminescent structures may be added to the illumination assembly 68 that convert the excitation light 24 emitted from the light source 76 to a different wavelength. Alternatively still, the controller 116 may prompt the light source 76 to alternate between periodically emitting the first and second wavelengths of excitation light 24 to cause the second photoluminescent structure 74 to periodically illuminate by alternating between the first and second colors of converted light 26. The controller 116 may prompt the light source 76 to periodically emit the first and/or second wavelengths of excitation light 24 at a regular time interval and/or an irregular time interval.

With respect to the above examples, the controller 116 may modify the intensity of the emitted first and second wavelengths of excitation light 24 by pulse-width modulation or current control. In some embodiments, the controller 116 may be configured to adjust a color of the converted light 26 by sending control signals to adjust an intensity or energy output level of the light source 76. For example, if the light source 76 is configured to output the excitation light 24 at a low level, substantially all of the excitation light 24 may be converted to the outputted, visible converted light 26. If the light source 76 is configured to emit excitation light 24 at a high level, only a portion of the excitation light 24 may be converted to the converted light 26 by the photoluminescent structure 10. In this configuration, a color of light corresponding to mixture of the excitation light 24 and the converted light 26 may be output as the outputted light. In this way, each of the controllers 116 may control an output color of the outputted light.

Though a low level and a high level of intensity are discussed in reference to the excitation light 24, it shall be understood that the intensity of the excitation light 24 may be varied among a variety of intensity levels to adjust a hue of the color corresponding to the emitted excitation and/or converted light 24, 26 from the illumination assembly 68.

As described herein, the color of the converted light 26 may be significantly dependent on the particular photoluminescent material 18 utilized in the photoluminescent structure 10, 74. Additionally, a conversion capacity of the photoluminescent structure 10, 74 may be significantly dependent on a concentration of the photoluminescent materials 18 utilized in the photoluminescent structure 10, 74. By adjusting the range of intensities that may be emitted from the light source 76, the concentration and proportions of the photoluminescent materials 18 in the photoluminescent structure 10, 74 and the types of photoluminescent materials 18 utilized in the photoluminescent structure 10, 74 discussed herein may be operable to generate a range of color hues of outputted light by blending the excitation light 24 with the converted light 26. It is also contemplated that the intensity of each light source 76 may be varied simultaneously, or independently, from any number of other light sources 76.

A variety of advantages may be derived from the use of the present disclosure. For example, use of the disclosed illumination assembly 68 may allow for consistent passive and active illumination of a vehicle charging station 94. The passive illumination system 70 may cause negligible effects to magnetic fields, and/or any other electrical components of the charging station 94 while illuminating. The active illumination system 72 may complement the passive illumination system 70 and provide additional lighting to components of the vehicle charging system 28. Additionally, or alternatively, the light detecting device 78 may illuminate the active illumination system 72 when low levels of light are emitted from the passive illumination system 70.

Further, use of the wireless communication transceivers 174, 176 allows for the illumination assembly 68 to be activated as a person approaches. Further, due to the low package space requirements of the illumination assembly 68, the illumination assembly 68 may be disposed on nearly any portion of the charging station 94. Finally, use of the wireless communication transceivers 174, 176 allows for a low consumption of power from the vehicle 36 and the charging station 94 while not in use.

Accordingly, a lighting assembly for a vehicle charging system has been advantageously described herein. The lighting assembly provides various benefits including an efficient and cost-effective means to produce illumination that may function as a distinct styling element that increases the refinement of a vehicle charging system, or any other product that may have an illumination assembly disposed thereon.

It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electric devices may be configured to execute a computer-program that is embodied in a non-transitory computer readable medium that is programmed to perform any number of the functions as disclosed.

It is also important to note that the construction and arrangement of the elements of the disclosure as shown in the exemplary embodiments are illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown in multiple parts may be integrally formed, the operation of the interfaces may be reversed or otherwise varied, the length or width of the structures and/or members or connectors or other elements of the system may be varied, the nature or number of adjustment positions provided between the elements may be varied. It should be noted that the elements and/or assemblies of the system might be constructed from any of the wide variety of materials that provide sufficient strength or durability, in any of the wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A wireless vehicle charging system, comprising:
   a charging station having a power source and a charging station interface operably coupled to a primary coil assembly, the primary coil assembly including a primary coil therein for generating a magnetic field;
   an illumination system disposed on the primary coil assembly including a passive illumination system and an active illumination system;
   a first photoluminescent structure utilized with the passive illumination system and configured to luminesce in response to excitation by an incident light;
   a second photoluminescent structure utilized with the active illumination system and configured to luminesce in response to excitation by a light source; and
   a vehicle having a secondary coil assembly thereon operably coupled with a rectifier and configured to transmit electrical current from the secondary coil assembly to a battery.

2. The wireless vehicle charging system of claim 1, wherein the passive illumination system illuminates from a top surface of the primary coil assembly above the coil.

3. The wireless vehicle charging system of claim 2, wherein the passive illumination system is configured to have a negligible effect on the magnetic field generated by the primary coil.

4. The wireless vehicle charging system of claim 1, wherein the active illumination system is disposed outwardly of the primary coil and includes LED sources dispersed in a printed LED arrangement.

5. The wireless vehicle charging system of claim 1, wherein the first and second photoluminescent structures each include at least one photoluminescent material therein configured to convert an excitation light into a visible converted light.

6. The wireless vehicle charging system of claim 1, wherein the first photoluminescent structure illuminates in a first color and the second photoluminescent structure illuminates in a second color.

7. The wireless vehicle charging system of claim 3, wherein the first photoluminescent structure includes a long persistence photoluminescent material therein that is configured to emit converted light for more than one hour after the removal of the excitation light.

8. A vehicular charging system, comprising:
   a primary coil assembly configured to generate a magnetic field;
   a secondary coil assembly configured to transmit electrical current from the secondary coil assembly to a battery, the primary coil assembly disposed externally of a vehicle; and
   a photoluminescent structure on the primary coil assembly and configured to luminesce in response to excitation by a light source when the photoluminescent structure is disposed between the primary and secondary coil assembly.

9. The charging system of claim 8, further comprising:
   a light detecting device configured to sense a level of incident light disposed around a surface of the primary coil assembly.

10. The charging system of claim 9, wherein the light detecting device is disposed proximate a rear portion of the primary coil assembly, wherein the rear portion is disposed away from a front portion of a vehicle.

11. The charging system of claim 8, wherein the light source includes LED sources dispersed in a printed LED arrangement.

12. The charging system of claim 8, wherein the controller is configured to activate the light source based on predefined events when a vehicle having a vehicle transceiver therein is disposed proximately to the primary coil assembly and is in communication with the controller.

13. The charging system of claim 8, wherein the controller is configured to activate the light source based on predefined events when an electronic device is disposed proximately to the primary coil assembly and is in communication with the controller.

14. A charging system, comprising:
   a charging station configured to electrically couple to a vehicle, the charging station including a primary coil assembly separable from the vehicle and configured to transmit electrical current from the charging station to a battery; and
   a first photoluminescent structure disposed on the charging station and configured to luminesce in response to excitation by an incident light when the vehicle is separated from the primary coil assembly.

15. The charging system of claim 14, further comprising:
   a second photoluminescent structure operably coupled with a light source, wherein the light source emits excitation light and the second photoluminescent structure luminesces in response to receiving the excitation light.

16. The charging system of claim 15, wherein the light source includes LED sources dispersed in a printed LED arrangement that are each configured to emit an excitation light.

17. The charging system of claim 16, wherein the light source is configured as a border that correlates with a portion of the charging station.

18. The charging system of claim 14, wherein the first photoluminescent structure includes a long persistence photoluminescent material therein.

19. The charging system of claim 14, wherein illumination provided by the first photoluminescent structure has a substantially negligible effect on the charging efficiency of the charging system.

20. The charging system of claim 15, wherein the light source is illuminated during a night-like condition.

* * * * *